United States Patent
Theobald et al.

(10) Patent No.: US 11,769,016 B2
(45) Date of Patent: Sep. 26, 2023

(54) GENERATING RESPONSES TO USER INTERACTION DATA BASED ON USER INTERACTION-STYLES

(71) Applicant: Apple Inc., Cupertino, CA (US)

(72) Inventors: Barry-John Theobald, Sunnyvale, CA (US); Nicholas Elia Apostoloff, San Jose, CA (US); Garrett Laws Weinberg, Santa Cruz, CA (US); Russell Y. Webb, San Jose, CA (US); Katherine Elaine Metcalf, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 518 days.

(21) Appl. No.: 16/798,858

(22) Filed: Feb. 24, 2020

(65) Prior Publication Data

US 2020/0311347 A1    Oct. 1, 2020

Related U.S. Application Data

(60) Provisional application No. 62/824,551, filed on Mar. 27, 2019.

(51) Int. Cl.
*G06F 40/35* (2020.01)
*G06F 40/30* (2020.01)
(Continued)

(52) U.S. Cl.
CPC .............. *G06F 40/35* (2020.01); *G06F 18/24* (2023.01); *G06F 40/253* (2020.01); *G06F 40/30* (2020.01);
(Continued)

(58) Field of Classification Search
CPC ...... G06F 40/30; G06F 40/253; G06K 9/6267
See application file for complete search history.

(56) References Cited

U.S. PATENT DOCUMENTS 10,594,757 B1 *   3/2020   Shevchenko ......... G10L 15/197
2010/0324896 A1 * 12/2010  Attwater ................ G10L 15/08
                                                        704/238

(Continued)

OTHER PUBLICATIONS

PCT International Search Report and Written Opinion dated Jun. 19, 2020, International Application No. PCT/US2020/020879, pp. 1-13.

(Continued)

*Primary Examiner* — Kevin Ky
(74) *Attorney, Agent, or Firm* — Fernando & Fernando, LLP

(57) ABSTRACT

A method includes obtaining user input interaction data. The user input interaction data includes one or more user interaction input values respectively obtained from the corresponding one or more input devices. The user input interaction data includes a word combination. The method includes generating a user interaction-style indicator value corresponding to the word combination in the user input interaction data. The user interaction-style indicator value is a function of the word combination and a portion of the one or more user interaction input values. The method includes determining, using a semantic text analyzer, a semantic assessment of the word combination in the user input interaction data based on the user interaction-style indicator value and a natural language assessment of the word combination. The method includes generating a response to the user input interaction data according to the user interaction-style indicator value and the semantic assessment of the word combination.

29 Claims, 11 Drawing Sheets

(51) Int. Cl.
  *G06F 40/253* (2020.01)
  *G06F 18/24* (2023.01)
  *G06V 10/764* (2022.01)
  *G06V 10/82* (2022.01)
  *G06V 40/20* (2022.01)

(52) U.S. Cl.
  CPC ............ *G06V 10/764* (2022.01); *G06V 10/82* (2022.01); *G06V 40/23* (2022.01)

(56) References Cited

U.S. PATENT DOCUMENTS

| | | | | |
|---|---|---|---|---|
| 2014/0303960 | A1* | 10/2014 | Orsini | G06Q 30/0217 704/2 |
| 2019/0005021 | A1* | 1/2019 | Miller | G10L 15/26 |
| 2019/0107992 | A1* | 4/2019 | Kim | G06F 3/16 |
| 2019/0147869 | A1* | 5/2019 | Wang | G10L 25/51 704/251 |
| 2019/0287519 | A1* | 9/2019 | Ediz | G06F 40/30 |
| 2019/0295533 | A1* | 9/2019 | Wang | G10L 15/22 |
| 2020/0005364 | A1* | 1/2020 | Aznaurashvili | H04W 4/80 |
| 2020/0117858 | A1* | 4/2020 | Freeman | G06F 40/35 |
| 2020/0311347 | A1* | 10/2020 | Theobald | G06F 40/30 |
| 2021/0134268 | A1* | 5/2021 | Huang | G10L 25/30 |
| 2021/0182339 | A1* | 6/2021 | Carrier | G06F 40/30 |
| 2021/0406928 | A1* | 12/2021 | Kubota | G06Q 30/0207 |

OTHER PUBLICATIONS

Tong Niu et al., "Polite Dialogue Generation Without Parallel Data", Transactions of the Association for Computational Linguistics, vol. 6, 2018, pp. 373-389.

Elisabeih Andre et al., "Multimodal Fusion in Human-Agent Dialogue", Coverbal Synchrony in Human-Machine Interaction, 2014, pp. 387-410.

Li Zhou et al., "The design and implementation of xiaoice, an empathetic social chatbot", Computational Linguistics, vol. 46, No. 1, 2020, pp. 53-93.

Reina Akama et al., "Generating stylistically consistent dialog responses with transfer learning", Proceedings of the Eighth International Joint Conference on Natural Language Processing (vol. 2: Short Papers), 2017, pp. 408-412.

* cited by examiner

400

Input modality characterization vector 410-1

| Word Combo 420-1 | Speech Value 430a-1 | Word Choice Value 430b-1 | Body Language Value 430c-1 | ... | Sub-Value No. 430N-1 |

Input modality characterization vector 410-2

| Word Combo 420-2 | Speech Value 430a-2 | Word Choice Value 430b-2 | Body Language Value 430c-2 | ... | Sub-Value No. 430N-2 |

Input modality characterization vector 410-3

| Word Combo 420-3 | Speech Value 430a-3 | Word Choice Value 430b-3 | Body Language Value 430c-3 | ... | Sub-Value No. 430N-3 |

●
●
●

Input modality characterization vector 410-M

| Word Combo 420-M | Speech Value 430a-M | Word Choice Value 430b-M | Body Language Value 430c-M | ... | Sub-Value No. 430N-M |

Figure 4

GENERATING RESPONSES TO USER INTERACTION DATA BASED ON USER INTERACTION-STYLES

CROSS-REFERENCE TO RELATED APPLICATION

This application claims priority to U.S. Provisional Patent App. No. 62/824,551 filed on Mar. 27, 2019, which is hereby incorporated by reference in its entirety.

TECHNICAL FIELD

The present disclosure relates to generating responses to user input data, and, in particular, generating responses to user interaction data based on user interaction-styles.

BACKGROUND

Increasingly, a user device includes a machine assistant or artificial agent (e.g., expert system, artificial intelligence (AI) system, chat bot system, etc.). The machine assistant may be capable of performing a variety of useful tasks for a human user. However, the human user is sometimes apprehensive about trusting a machine assistant, even though the machine assistant may be a more consistent and accurate performer of particular tasks than the human user. In turn, the human user is apprehensive to delegate tasks to the machine assistant, and therefore does not utilize the full potential of a user device equipped with the machine assistant. In other situations, the human user delegates tasks to the machine assistant, but provides unnecessary inputs to the machine assistant in order to verify or validate the behavior of the machine assistant. Unnecessary user inputs degrade performance of the user device and may even reduce the privacy and/or safety associated with the user device. Accordingly, a machine assistant that engenders greater user confidence in the machine assistant would result in greater performance of the machine assistant as well as enhanced privacy and/or safety from the perspective of the human user of the machine assistant.

SUMMARY

In accordance with some implementations, a method is performed at an electronic device with one or more processors and a non-transitory memory. The method includes obtaining a training data corpus that includes a plurality of word combinations. Each of the plurality of word combinations includes one or more words. Each of the plurality of word combinations is associated with a corresponding input modality characterization vector and a corresponding predetermined interaction-style indicator value. The corresponding predetermined interaction-style indicator value is a function of one or more elements of the corresponding input modality characterization vector and a predetermined semantic characterization of the one or more words. The method further includes obtaining a plurality of semantic assessments corresponding to a portion of the plurality of word combinations in the training data corpus. The method further includes generating, using an interaction-style classifier, a plurality of candidate interaction-style indicator values corresponding to the portion of the plurality of word combinations in the training data corpus. Each of the plurality of candidate interaction-style indicator values is based on the corresponding one or more words and the corresponding input modality characterization vector. Each of the plurality of candidate interaction-style indicator values is a function of at least a portion of the corresponding input modality characterization vector and the corresponding semantic assessment of the one or more words. The method further includes comparing each of the plurality of candidate interaction-style indicator values against the corresponding predetermined interaction-style indicator value. The method further includes in response to determining that an aggregated result of the comparison between each of the plurality of candidate interaction-style indicator values against the corresponding predetermined interaction-style indicator value does not satisfy an error metric, changing an operational value of the interaction-style classifier.

In accordance with some implementations, a method is performed at an electronic device with one or more processors, one or more input devices, and a non-transitory memory. The method includes obtaining user input interaction data, via the one or more input devices. The user input interaction data includes one or more user interaction input values respectively obtained from the corresponding one or more input devices. The user input interaction data includes a word combination. The method further includes generating, by an interaction-style classifier, a user interaction-style indicator value corresponding to the word combination in the user input interaction data. The user interaction-style indicator value is a function of the word combination and a portion of the one or more user interaction input values. The method further includes determining, using a semantic text analyzer, a semantic assessment of the word combination in the user input interaction data based on the user interaction-style indicator value and a natural language assessment of the word combination. The method further includes generating a response to the user input interaction data according to the user interaction-style indicator value and the semantic assessment of the word combination.

In accordance with some implementations, an electronic device includes (optionally) one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device and (optionally) one or more input devices, cause the device to perform or cause performance of the operations of any of the methods described herein. In accordance with some implementations, an electronic device includes: (optionally) one or more input devices and means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIG. 4 is an example of a representation of input modality characterization vectors according to some implementations.

SUMMARY

Figure 1:
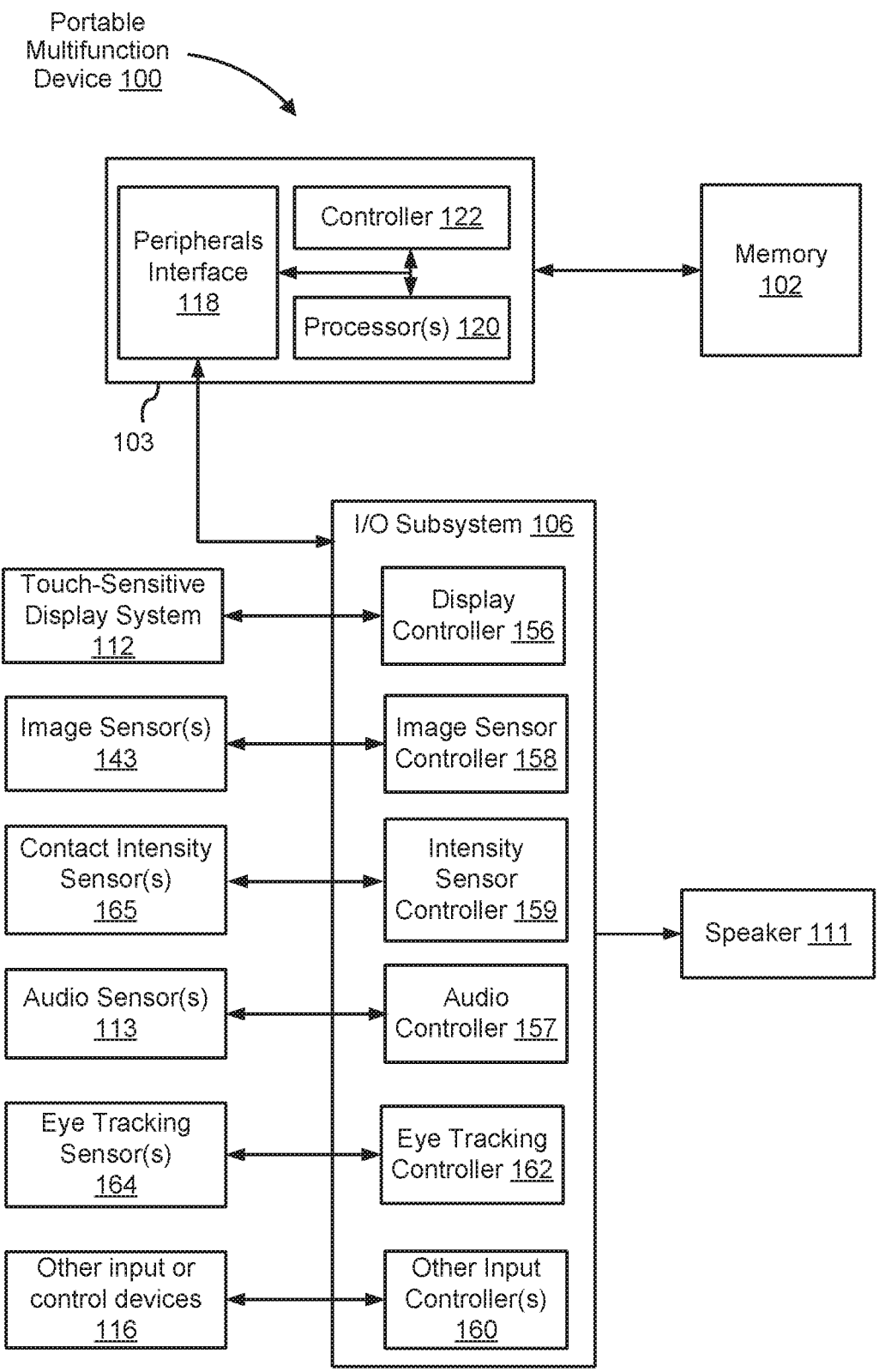
FIG. 1 is a block diagram of an example of a portable multifunction device in accordance with some implementations.

According to various implementations disclosed herein, methods, systems, and electronic devices provide a machine assistant that generates a response to user interaction input data provided by a user that is based on a corresponding interaction-style (e.g., word choice, speech characteristics, body language, etc.) associated with the user. There is evidence suggesting that a particular conversation partner trusts (e.g., views as more credible and/or reliable) another conversation partner more when the other conversation partner exhibits a similar interaction-style. Accordingly, in some implementations, the machine assistant assesses user interaction input data in order to determine a corresponding interaction-style (e.g., how the user interacts) associated with a word combination. Moreover, in some implementations, the machine assistant determines a semantic understanding of the word combination and determines how the interaction-style affects the semantic understanding. Accordingly, in some implementations, the machine assistant produces responses that mirror the interaction-styles of the user in order to improve user trust in the machine assistant system. Improved user trust in the machine assistant results in the machine assistant obtaining fewer inputs that are connected with verifying the validity of responses generated by the machine assistant. Accordingly, resource utilization (e.g., processing power, memory usage) of the machine assistant may be reduced.

In order to improve the accuracy of the determined interaction-style of the user, in various implementations, an interaction-style classifier is trained by comparing predetermined interaction-style indicators against corresponding generated candidate user interaction-style indicator values for various word combinations, acoustic features (e.g., pitch variation), contextual information, etc. After training has begun, the interaction-style classifier generates a response to a user interaction input, wherein the response is based on the interaction-style of the user.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, image sensor(s) 143 (e.g., camera), contact intensity sensor(s) 165, audio sensor(s) 113 (e.g., microphone), eye tracking sensor(s) 164 (e.g., included within a head-mounted display (HMD)), and other input or control device(s) 116.

In some implementations, the peripherals interface 118, the one or more CPUs 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, and one or more input controllers 160 for other input or control devices. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, USB port, stylus, and/or a pointer device such as a mouse. The one or more buttons optionally include an up/down button for volume control of the speaker 111 and/or audio sensor(s) 113. The one or more buttons optionally include a push button.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The touch-sensitive display system 112 optionally has a video resolution in excess of 100 dpi. In some implementations, the touch screen video resolution is in excess of 400 dpi (e.g., 500 dpi, 800 dpi, or greater). The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.).

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the environment. In some implementations, at least one contact intensity sensor 165 is collocated with, or proximate to, a touch-sensitive surface of the electronic device 100. In some implementations, at least one contact intensity sensor 165 is located on the back of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mounted display (HMD) or within a heads-up display.

Figure 2:
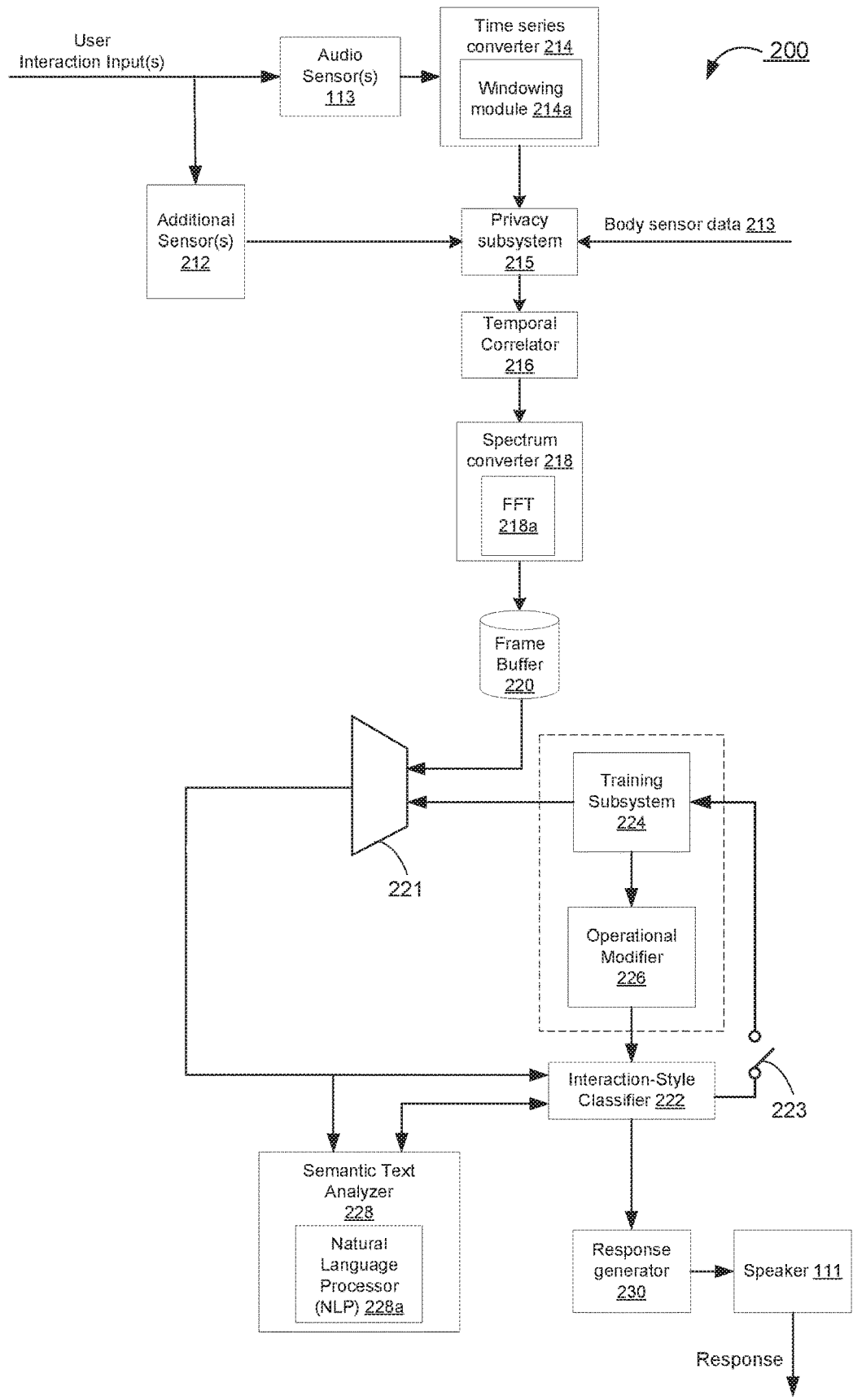
FIG. 2 is a block diagram of an example of a machine assistant that trains an interaction-style classifier and utilizes the interaction-style classifier in order to generate responses to user interaction data in accordance with some implementations.

FIG. 2 is a block diagram of an example of a machine assistant 200 that trains an interaction-style classifier and utilizes the interaction-style classifier in order to generate responses to user input interaction data in accordance with some implementations. In various implementations, the machine assistant 200 includes some or all of the components of the electronic device 100 in FIG. 1. For example, in some implementations, the additional sensors 212 of the machine assistant 200 include one or more of sensor(s) of the touch-sensitive display system 112, image sensor(s) 143, contact intensity sensor(s) 165, eye tracking sensor(s) 164, or other input or control devices 116 in FIG. 1. As another example, in some implementations, the machine assistant 200 includes a memory 102, a peripherals interface 118, CPU(s) 120, and a memory controller 122 for processing and storage resources. These processing and storage resources facilitate, for example, training of an interaction-style classifier 222, classifying user input interaction data by the interaction-style classifier 222, and generating responses to the user input interaction data by a response generator 230.

In various implementations, the machine assistant 200 or portions thereof are included in a device or system enabled with one or more machine-listening applications, such as a communication device included in an autonomous vehicle, a computer; a laptop computer; a tablet device; a mobile phone; a smartphone; a wearable (e.g., a smart watch); a gaming device; a hearing aid; an Internet-of-things (IoT) device; a computer generated reality (CGR) device (e.g., HMD, heads-up display) that displays CGR content, such as augmented reality (AR) content, virtual reality (VR) content, and/or mixed-reality content (MR) content; and/or the like.

While pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions and sub-functions implemented by the machine assistant 200 can be combined into one or more systems and/or further sub-divided into additional subsystems; and, that the functionality described below is provided as merely one example configuration of the various aspects and functions described herein.

To that end, as a non-limiting example, the machine assistant 200 includes one or more audio sensors 113, additional sensors 212, a time series converter 214, a privacy subsystem 215, a temporal correlator 216, a spectrum converter 218, a frame buffer 220, a mode-selection multiplexer (MUX) 221, an interaction-style classifier 222, a training switch 223, a training subsystem 224, an operational modifier 226, a semantic text analyzer 228, a response generator 230, and a speaker 111.

The audio sensor(s) 113 (e.g., microphone(s)) detect user interaction inputs corresponding to sound, such as human speech. The audio sensor(s) 113 are provided to receive and convert the sound into electronic signal data that can be stored in a non-transitory memory, which hereinafter is sometimes referred to as audible signal data. In many situations, audible signal data is captured from within an adverse acoustic environment, and thus likely includes ambient noise, interfering sounds, and background chatter in addition to a target voice of interest.

Accordingly, the audio sensor(s) 113 not only capture speech uttered by the user, but also capture situational context information associated with a user, such as background noise (e.g., music if the user is in a dance club). According to various implementations, situational context information is utilized in order to determine an interaction-style of a user. For example, if the situational context indicates that the user is in a noisy area, the machine assistant 200 determines that loud speech by the user is not necessarily indicative of an angry user; rather, it may be because the user needs to shout in order to be heard by his or her conversation partner. As another example, the audio sensor(s) 113 may capture speech uttered by a conversation partner of a user. Speech of the conversation partner may be utilized by the machine assistant 200 in determining an interaction-styles of the user. For example, a certain user may mimic the conversation style of a conversation partner in order to make the conversation partner more comfortable.

In many applications, the audio sensor(s) 113 provide the audible signal data as an ongoing or continuous time series of values. In turn, the times series converter 214 is configured to generate two or more temporal frames of audible signal data from a continuous stream of audible signal data. Each temporal frame of audible signal data includes a temporal portion of the audible signal received by the audio sensor(s) 113. In some implementations, the times series converter 214 includes a windowing module 214a that is configured to mark and separate one or more temporal frames or portions of the audible signal data for times t1, t2, . . . , tn. In some implementations, each temporal frame of the audible signal data is conditioned by a pre-filter (not shown). For example, in some implementations, pre-filtering includes band-pass filtering to isolate and/or emphasize the portion of the frequency spectrum typically associated with human speech. In some implementations, pre-filtering includes pre-emphasizing portions of one or more temporal frames of the audible signal data in order to adjust the spectral composition of the one or more temporal frames of the audible signal data. Additionally and/or alternatively, in some implementations, the windowing module 214a is configured to retrieve the audible signal data from a non-transitory memory. Additionally and/or alternatively, in some implementations, pre-filtering includes filtering the received audible signal using a low-noise amplifier (LNA) in order to substantially set a noise floor for further processing. In some implementations, a pre-filtering LNA is arranged between the audio sensor(s) 113 and the time series converter 214. Those of ordinary skill in the art will appreciate that numerous other pre-filtering techniques may be applied to the received audible signal, and those highlighted herein are merely examples of numerous pre-filtering options available.

The one or more additional sensors 212 detect corresponding one or more additional user interaction inputs. The additional sensor(s) 212 may include one or more of the touch-sensitive display systems 112, the image sensor(s) 143, the contact intensity sensor(s) 165, the eye tracking sensor(s) 164, or the other input or control devices 116 in FIG. 1. For example, in some implementations, the additional sensor(s) 212 include an image sensor (e.g., a camera) that detects body language of a user, such as body pose information and facial expressions and features of the user. Body language may be indicative of an interaction-style of the user. For example, frequent hand gestures may indicate a more talkative user, whereas a furrowed brow may indicate an agitated user who is reticent to engage in conversation. Moreover, image data may be used in order to determine the situational context of the user, such as location of the user, bystanders of the user, etc. For example, if the machine assistant 200 determines that the user is proximate to a sleeping baby, the machine assistant 200 may determine that quiet speech from the user is not necessarily indicative of a shy or quiet user. As another example, image data may be used in order to determine body language of a conversation partner of a user who is using the machine assistant 200. For instance, image data may indicate that the user is mimicking body language of the conversation partner in order to make the conversation partner more comfortable and/or more trusting of the user.

As one example, in some implementations, the additional sensor(s) 212 include a keyboard device that detects the keystrokes of a user. For example, faster typing may indicate a correspondingly talkative (e.g., chatty) user interaction-style. As another example, frequent typing errors may indicate a user who is reckless with the accuracy of his or her speech.

As yet another example, in some implementations, the additional sensor(s) 212 include an eye tracking sensor that detects eye movements of the user. The machine assistant 200 may utilize eye position, eye movements, and/or eye movement patterns of the user in order to determine an interaction-style of the user.

In some implementations, the machine assistant 200 obtains body sensor data 213. The body sensor data 213 may be obtained from a variety of sources, including but not limited to a wearable device (e.g., smartwatch, continuous blood glucose monitor (CGM)); an inertial movement unit (IMU) integrated in a device, such as a smartphone; and/or the like. In some implementations, the body sensor data 213 is obtained from a device that is separate from an electronic device that includes the machine assistant 200. In some implementations, the body sensor data 213 is obtained from a subsystem physically included within an electronic device that includes the machine assistant 200. The body sensor data 213 may correspond to a variety of types of data that provides physiological and/or biological attributes of a user. For example, the body sensor data 213 may include a combination of heart rate data, pulse rate data, EKG data, blood oxygen level data, and/or the like.

In various implementations, the machine assistant 200 includes a privacy subsystem 215 that includes one or more privacy setting filters associated with user information, such as user information included in the user interaction input(s) and/or the body sensor data 213 illustrated in FIG. 2, and/or identifying information. In some implementations, the privacy subsystem 215 selectively prevents and/or limits the machine assistant 200 or portions thereof from obtaining and/or transmitting the user information. To this end, the privacy subsystem 215 receives user preferences and/or selections from the user in response to prompting the user for the same. In some implementations, the privacy subsystem 215 prevents the machine assistant 200 from obtaining and/or transmitting the user information unless and until the privacy subsystem 215 obtains informed consent from the user. In some implementations, the privacy subsystem 215 anonymizes (e.g., scrambles or obscures) certain types of user information. For example, the privacy subsystem 215 receives user inputs designating which types of user information the privacy subsystem 215 anonymizes. As another example, the privacy subsystem 215 anonymizes certain types of user information likely to include sensitive and/or identifying information, independent of user designation (e.g., automatically).

The temporal correlator 216 is provided to correlate detected speech by the audio sensor(s) with additional input(s) detected by corresponding additional sensor(s) 212 and/or the body sensor data 213. In some implementations, the temporal correlator 216 correlates audio data with video data, such as body language video data and situational context video data.

In some implementations, the temporal correlator 216 cooperates with the times series converter 214 in correlating speech data with other data. For example, in some implementations, the temporal correlator 216 generates two or more temporal frames of correlated data from a continuous stream of various types of data, including audible signal data, video data, eye gaze data, image data, computer generated reality (CGR) data (e.g., AR, VR, MR data), text data, and/or the like. In some implementations, the temporal correlator 216 utilizes the temporal frames of audible signal data generated by the times series converter 214. Utilizing video inputs that are provided concurrently with or contemporaneously with audio inputs (e.g., speech) may result in a more accurate determined interaction-style than by utilizing video inputs divorced from the audio inputs. For example, a certain user may make hand gestures or change facial expressions while speaking, and those captured video inputs are useful in determining an interaction-style of the user. If, on the other hand, the user is not speaking, and is, for example, swinging his hands while walking, the hand swinging body language information is not as useful in determining an accurate interaction-style.

The spectrum converter 218 operates to generate a corresponding frequency domain representation for each of the one or more correlated temporal frames generated by the temporal correlator 216, so that one or more spectral characteristics of the correlated data can be determined for each frame. In some implementations, the frequency domain representation of a temporal frame includes at least one of a plurality of sub-bands contiguously distributed throughout the frequency spectrum associated with voiced sounds. In some implementations, for example, the spectrum conversion module 218 includes a Fast Fourier Transform (FFT) sub-block 218*a*. In some implementations, a 32-point short-time FFT is used for conversion into the frequency domain. Those of ordinary skill in the art will appreciate that any number of FFT implementations are used in various implementations. In various implementations, the FFT module 218a may also be replaced with a Goertzel module. Additionally and/or alternatively, the FFT module 218a may also be replaced with any suitable implementation of a wavelet decomposition module, constant-Q transform and/or a set of redundant basis function modules configured to capture pertinent spectral characteristics of the input signal. In some implementations, an optional spectral filter module (not shown) is configured to receive and adjust the spectral composition of the frequency domain representations of the one or more frames. In some implementations, for example, the spectral filter module is configured to one of emphasize, deemphasize, and/or isolate one or more spectral components of a temporal frame in the frequency domain. The frequency domain representations of the one or more frames are stored in the frame buffer 220.

In some implementations, the mode-selection MUX 221 is used to coordinate switching between a training mode and a detection (e.g., run-time) mode. In training mode, the mode-selection MUX 221 is used to couple the training subsystem 224 to the interaction-style classifier 222 in order to enable training of the interaction-style classifier 222, and the training switch 223 is set to "on" so that output of the interaction-style classifier 222 is provided to the training subsystem 224. In detection mode, the mode-selection MUX 221 is used to couple the frame buffer 220 to the interaction-style classifier 222, and the training switch 223 is set to "off" so that output of the interaction-style classifier 222 is not provided to the training subsystem 224. In some implementations, operation of the mode-selection MUX 221 is managed by a system controller (not shown) or operating system (e.g., the operating system 1107 in FIG. 11). In some implementations, the training subsystem 224 is provided separately.

In training mode, as will be discussed further with reference to FIG. 3, below, the interaction-style classifier 222 generates a plurality of candidate interaction-style indicator values corresponding to a portion of a plurality of word combinations. In some implementations, the interaction-style classifier 222 obtains targeted training data from the training subsystem 224 in order to generate the plurality of candidate interaction-style indicator values. The targeted training data includes the corresponding plurality of one or more words and a corresponding plurality of input modality characterization vectors. Each of the plurality of candidate interaction-style indicator values is based on the corresponding one or more words and the corresponding input modality characterization vector. Moreover, each of the plurality of candidate interaction-style indicator values is a function of at least a portion of the corresponding input modality characterization vector and a corresponding semantic assessment of the one or more words.

In some implementations, the interaction-style classifier 222 obtains the corresponding plurality of semantic assessments of one or more words from the semantic text analyzer 228. A semantic assessment corresponds to an understanding or meaning of the corresponding word combination. In some implementations, each of the corresponding plurality of semantic assessments includes one or more candidate interpretations of the corresponding word combination. In some implementations, the semantic text analyzer 228 includes a natural language processor (NLP) 228a in order to generate the corresponding plurality of semantic assessments.

In order to train the interaction-style classifier 222, the training subsystem 224 directs the operational modifier 226 to modify an operation value of the interaction-style classifier 222. Modifying the operation value of the interaction-style classifier 222 is based on a comparison between the plurality of candidate interaction-style indicator values against a corresponding plurality of predetermined interaction-style indicator values. Each of the corresponding plurality of predetermined interaction-style indicator values is a function of one or more elements of the corresponding input modality characterization vector and a predetermined semantic characterization of the one or more words.

In detection mode (e.g., run-time mode), the interaction-style classifier 222 generates a user interaction-style indicator value corresponding to a word combination in user input interaction data (e.g., audible signal data, video data, text data, eye gaze data, etc.). In some implementations, the user input interaction data is obtained via the audio sensor(s) 113 and/or the additional sensor(s) 212, as described above. The user interaction-style indicator value is a function of the word combination and a portion of the one or more user interaction input values. Moreover, similar to the procedure described above, the semantic text analyzer 228 determines (e.g., generates) a semantic assessment of the word combination in the user input interaction data based on the user interaction-style indicator value and a natural language assessment of the word combination. Based on the user interaction-style indicator value and the semantic assessment of the word combination, the response generator 230 generates a response to the user input interaction data. In some implementations, the speaker 111 plays the response to the user.

Accordingly, the response to the user input interaction data is based on a determined interaction-style associated with the user. Evidence suggests that a response to user input that is based on an interaction-style of the user engenders confidence in the user that the response is valid, credible, and/or trustworthy. Consequently, the machine assistant 200 obtains fewer inputs related to validating the responses generated by the machine assistant 200. The machine assistant 200, therefore, expends fewer processing and memory resources because of this reduction of inputs.

Figure 3:
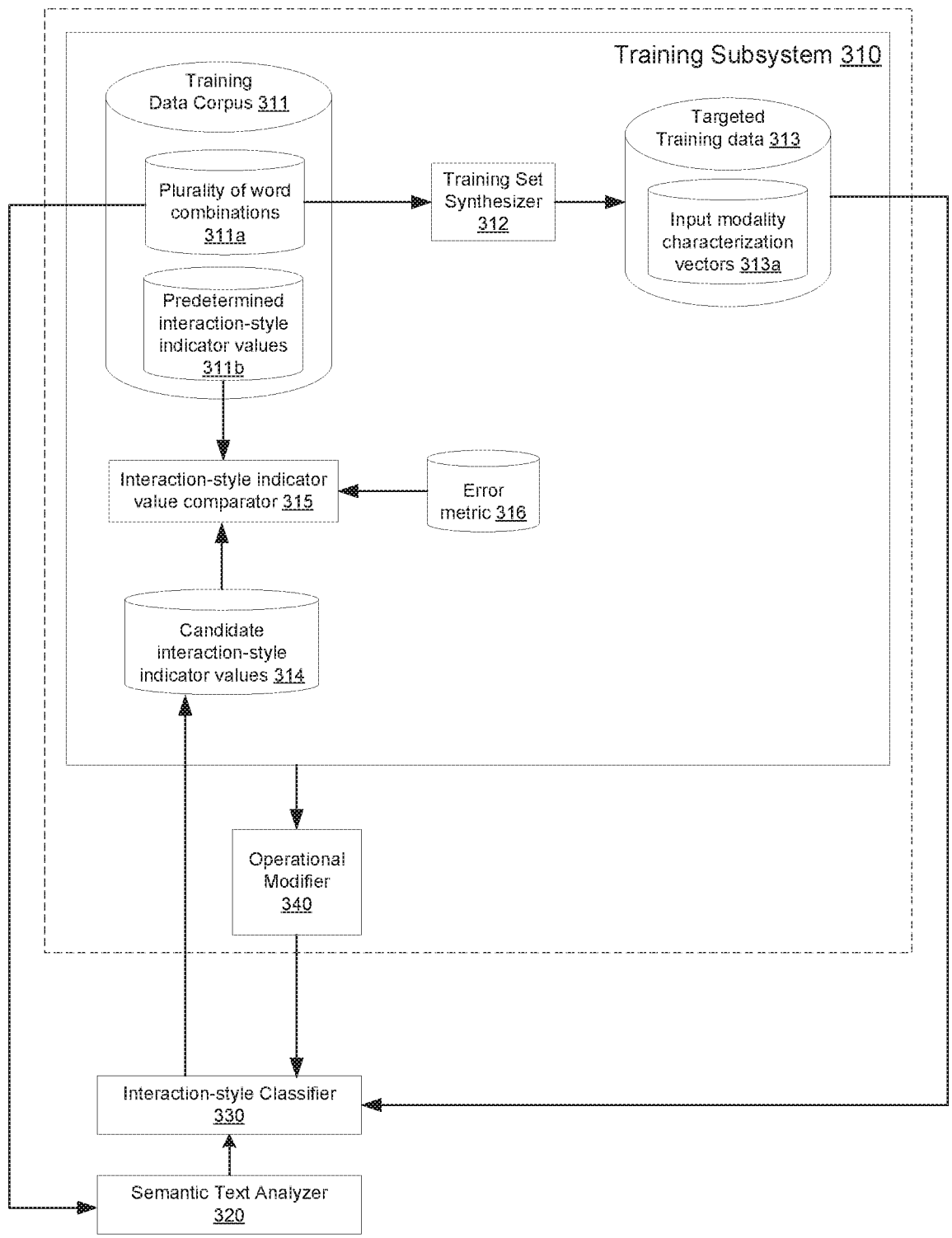
FIG. 3 is a block diagram of an example of a training system for training an interaction-style classifier in accordance with some implementations.

FIG. 3 is a block diagram of an example of a training system 300 for training an interaction-style classifier in accordance with some implementations. While pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions and sub-functions implemented by the training system 300 can be combined into one or more systems and/or further sub-divided into additional subsystems; and, that the functionality described below is provided as merely one example configuration of the various aspects and functions described herein.

To that end, as a non-limiting example, the training system 300 includes a training subsystem 310, a semantic text analyzer 320, an interaction-style classifier 330, and an operational modifier 340. In some implementations, the training subsystem 310 or portions thereof are similar to and adapted from the training subsystem 224 in FIG. 2. In some implementations, the operational modifier 340 or portions thereof are similar to and adapted from the operational modifier 226 in FIG. 2. In some implementations, the interaction-style classifier 330 or portions thereof are similar to and adapted from the interaction-style classifier 222 in FIG. 2. In some implementations, the semantic text analyzer 320 or portions thereof are similar to and adapted from the semantic text analyzer 228 in FIG. 2.

The training subsystem 310 includes a training data corpus buffer 311 that includes a plurality of word combinations 311*a* and a corresponding plurality of predetermined interaction-style indicator values 311*b*. A particular one of the plurality of word combinations 311*a* corresponds to one-word, multiple words (e.g., a phrase, sentence, etc.), or parts of one word (e.g., syllable, phoneme, etc.). Each of the plurality of word combinations 311*a* is associated with a corresponding input modality characterization vector 313*a* and a corresponding predetermined interaction-style indicator value 311*b*. As further described with referenced to FIG. 4, below, a particular input modality characterization vector 313*a* quantitatively characterizes a corresponding word combination. For example, a word combination of "I am so angry right now!" may be associated with an input modality characterization vector that includes a speech value corresponding to the word combination, such as a pitch value, speaking rate, pitch, fundamental frequency, jitter, variance, etc. Continuing with the previous example, the input modality characterization vector may include a body language value indicative of body language of a user while the user provided the word combination, such as eyebrow movement values that are quantitatively indicative of an angry facial expression. A particular predetermined interaction-style indicator value, on the other hand, qualitatively characterizes a word combination. Continuing with the previous example, the corresponding predetermined interaction-style indicator value associated with the word combination of "I am so angry right now!" is a higher-pitched voice level (as compared with nominal pitch level), faster speech rate, louder speech, etc.

In some implementations, the training subsystem 310 further includes a training set synthesizer 312. The training set synthesizer 312 synthesizes the plurality of input modality characterization vectors 313*a* based on the corresponding plurality of word combinations 311*a*. In some implementations, a targeted training data buffer 313 (e.g., allocated in a non-transitory memory) is provided in order to store targeted training data sets generated by the training set synthesizer 312. In some implementations, the targeted training data buffer 313 includes the plurality of input modality characterization vectors 313*a* and corresponding plurality of word combinations 311*a*. The targeted training data sets are provided to the interaction-style classifier 330.

The training system 300 further includes a semantic text analyzer 320 that generates a plurality of semantic assessments corresponding to a portion of the plurality of word combinations stored in the corresponding buffer 311*a*, such as described above with reference to FIG. 2. The semantic text analyzer 320 provides the plurality of semantic assessments to the interaction-style classifier 330.

Based on the plurality of input modality characterization vectors and the plurality of semantic assessments, the interaction-style classifier 330 generates a plurality of candidate interaction-style indicator values. The plurality of candidate interaction-style indicator values corresponds to the portion of the plurality of word combinations in the training data corpus buffer 311*a*. The interaction-style classifier 330 provides the plurality of candidate interaction-style indicator values to the training subsystem 310. In some implementations, the training subsystem 310 stores the plurality of candidate interaction-style indicator values in a candidate interaction-style indicator values datastore 314.

The training subsystem 310 includes an interaction-style indicator value comparator 315. The interaction-style indicator value comparator 315 compares each of the plurality of candidate interaction-style indicator values in the datastore 314 against a corresponding predetermined interaction-style indicator value in corresponding buffer 311*b*. The interaction-style indicator value comparator 315 determines whether an aggregated result of the comparison between each of the plurality of candidate interaction-style indicator values against the corresponding predetermined interaction-style indicator value satisfies an error metric (e.g., buffered in an error metric datastore 316). In response to determining that the aggregated result does not satisfy the error metric, the training subsystem 310 directs the operational modifier 340 to change an operational value of the interaction-style classifier 330. In some implementations, the error metric is satisfied when a sufficient number of the plurality of candidate interaction-style indicator values match the corresponding predetermined interaction-style indicator values within a threshold percentage. Accordingly, the interaction-style classifier 330 is trained based on quantitative and qualitive interaction-style information.

FIG. 4 is an example of a representation 400 of input modality characterization vectors according to some implementations. Each of the input modality characterization vectors 410-1-410-M quantitatively characterizes a corresponding word combination. With reference to FIG. 3, above, in some implementations, a training subsystem 310 synthesizes a plurality of input modality characterization vectors from a corresponding plurality of word combinations. The training subsystem 310 provides the plurality of input modality characterization vectors to the interaction-style classifier 330 for training purposes.

Each of the input modality characterization vectors 410-1-410-M is associated with a corresponding word combination, as well as a plurality of values and/or sub-values that quantitatively characterizes the corresponding word combination. In some implementations, a particular value and/or sub-value may include numerous pieces of information. A particular word combination corresponds to a single word, multiple words, or a portion of a single word (e.g., phoneme, syllable, etc.). One of ordinary skill in the art will appreciate that various types of values may be included within each input modality characterization vector, and that the examples provided below are merely illustrative and not exhaustive.

As one example, an input modality characterization vector 410-1 is associated with a word combination 420-1 of text "hello, my nam is Joe." Because the word combination 420-1 is text and not speech, input modality characterization vector 410-1 has a zero or nil value for speech value 430*a*-1. On the other hand, the input modality characterization vector 410-1 has a word choice value 430*b*-1 that quantitatively characterizes the word combination 420-1 as text. For example, the word choice value 430*b*-1 indicates a text input speed of 50 words per minute corresponding to the word combination 420-1 of text "hello, my nam is Joe." As another example, the word choice value 430*b*-1 indicates an error rate of 20% because one ("nam") out of five words is incorrectly spelled.

As one example, an input modality characterization vector 410-2 is associated with a word combination 420-2 of speech "isn't the weather nice today?" The speech value 430*a*-2 quantitatively indicates an upward inflection because the word combination 420-2 is a question. Moreover, the speech value 430*a*-2 indicates an average frequency value of 2000 Hz for the speech. The body language value 430*c*-2 provides certain facial movements associated with the speech (e.g., movement of the lips) and hand gestures associated with the speech (e.g., palms are facing upwards in order to signal open body language to invite a response to the question).

As one example, an input modality characterization vector 410-3 is associated with a word combination 420-3 of speech "I am going to grab another drink," such as would be uttered inside a dance club to a friend by a user of the machine assistant. The speech value 430a-3 quantitatively indicates loud slurred speech and an upbeat speech tone, as well as relatively loud ambient noise (e.g., music in the dance club). The word choice value 430b-3 indicates seven words, a declarative statement, and approximately 3.7 letters per word. A situational context value (not shown) indicates many bystanders of the user.

Figure 5:
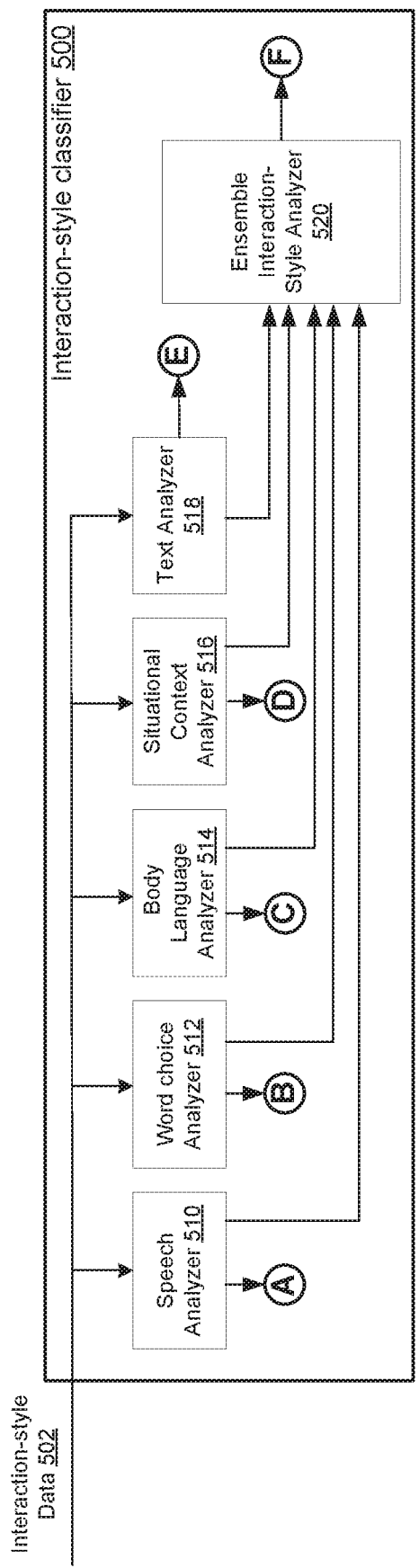
FIG. 5 is a block diagram of an example of an interaction-style classifier according to some implementations.

FIG. 5 is a block diagram of an example of an interaction-style classifier 500 according to some implementations. While pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions and sub-functions implemented by the interaction-style classifier 500 can be combined into one or more systems and/or further sub-divided into additional subsystems; and, that the functionality described below is provided as merely one example configuration of the various aspects and functions described herein. In some implementations, the interaction-style classifier 500 or portions thereof are similar to and adapted from the interaction-style classifier 222 in FIG. 2 and/or the interaction-style classifier 330 in FIG. 3.

The interaction-style classifier 500 includes a speech analyzer 510, a word choice analyzer 512, a body language analyzer 514, a situational context analyzer 516, and a text analyzer 518. Each of these analyzers classifies a corresponding portion of interaction-style data 502. Thus, the speech analyzer 510 classifies speech data; the word choice analyzer 512 classifies word choice data; the body language analyzer 514 classifies body language data; the situational context analyzer 516 classifies situational context data; and the text analyzer 518 classifies text data. In some implementations, as described below with reference to FIG. 6, some or all of these analyzers may include respective numerous sub-analyzers or sub-classifiers.

The interaction-style classifier 500 further includes an ensemble interaction-style analyzer 520. The ensemble interaction-style analyzer 520 synthesizes an output ("F") from a combination of multiple outputs from the speech analyzer 510, the word choice analyzer 512, the body language analyzer 514, the situational context analyzer 516, and/or the text analyzer 518.

With respect to the speech analyzer 510, in training mode the speech analyzer 510 generates a plurality of speech candidate interaction-style indicator values corresponding to a portion of a plurality of word combinations in a training data corpus in various implementations. Each of the plurality of speech candidate interaction-style indicator values is a function of a speech component of a corresponding input modality characterization vector and a corresponding semantic assessment of one or more words. The speech component of a particular input modality characterization vector includes one or more of pitch, frequency, speed, rhythm, cadence, amplitude, tone, inflection, intonation patterns (e.g., bouncy intonation, decaying intonation, etc.), etc.

In run-time mode (e.g., detection mode), in some implementations, the speech analyzer 510 generates a speech user interaction-style indicator value corresponding to a word combination in user input interaction speech data. The speech user interaction-style indicator value is a function of the word combination and a portion of one or more user interaction input values included within the user input interaction speech data.

With respect to the word choice analyzer 512, in training mode the word choice analyzer 512 generates a plurality of word choice candidate interaction-style indicator values corresponding to a portion of a plurality of word combinations in a training data corpus in various implementations. Each of the plurality of word choice candidate interaction-style indicator values is a function of a word choice component of a corresponding input modality characterization vector and a corresponding semantic assessment of one or more words. The word choice component of a particular input modality characterization vector includes one or more of total number of words, average characters (e.g., letters, punctuation, symbols, etc.) per word, total number of characters, total number of a specific character, total number of errors (e.g., misspelled word(s)), number of errors per word, quantified (e.g., categorized) difficulty of word choice, presence of idiom (e.g., expression, cliché, slogan) in word choice, etc. In run-time mode (e.g., detection mode), in some implementations, the word choice analyzer 512 generates a word choice user interaction-style indicator value corresponding to a word combination in user input interaction word choice data. The word choice user interaction-style indicator value is a function of the word combination and a portion of one or more user interaction input values included within the user input interaction word choice data.

With respect to the body language analyzer 514, in training mode the body language analyzer 514 generates a plurality of body language candidate interaction-style indicator values corresponding to a portion of a plurality of word combinations in a training data corpus in various implementations. Each of the plurality of body language candidate interaction-style indicator values is a function of a body language component of a corresponding input modality characterization vector and a corresponding semantic assessment of one or more words. The body language component of a particular input modality characterization vector includes one or more of current body pose, changes in body pose, facial expressions, facial features, facial changes, and/or the like. In run-time mode (e.g., detection mode), in some implementations, the body language analyzer 514 generates a body language user interaction-style indicator value corresponding to a word combination in user input interaction body language data. The body language user interaction-style indicator value is a function of the word combination and a portion of one or more user interaction input values included within the user input interaction body language data.

With respect to the situational context analyzer 516, in training mode the situational context analyzer 516 generates a plurality of situational context candidate interaction-style indicator values corresponding to a portion of a plurality of word combinations in a training data corpus in various implementations. Each of the plurality of situational context candidate interaction-style indicator values is a function of a situational context component of a corresponding input modality characterization vector and a corresponding semantic assessment of one or more words. The situational context component of a particular input modality characterization vector includes one or more of location (e.g., environment), number and quantified (e.g., categorized) type of bystanders (e.g., conversation partner of user of the machine assistant, baby in crib, etc.), background noise (e.g., music in club), etc. In run-time mode (e.g., detection mode), in some implementations, the situational context analyzer 516 generates a situational context user interaction-style indicator value corresponding to a word combination in user input interaction situational context data. The situational context user interaction-style indicator value is a function of the word combination and a portion of one or more user interaction input values included within the user input interaction situational context data.

With respect to the text analyzer 518, in training mode the text analyzer 518 generates a plurality of text candidate interaction-style indicator values corresponding to a portion of a plurality of word combinations in a training data corpus in various implementations. Each of the plurality of text candidate interaction-style indicator values is a function of a text component of a corresponding input modality characterization vector and a corresponding semantic assessment of one or more words. The text component of a particular input modality characterization vector includes one or more of: speed with which text is entered (e.g., typing speed), amount of time to enter certain text, errors in typing, force with which text is entered (e.g., hard press on keyboard versus soft touch on touch-sensitive surface), etc. In run-time mode (e.g., detection mode), in some implementations, the text analyzer 518 generates a text user interaction-style indicator value corresponding to a word combination in user input interaction text data. The text user interaction-style indicator value is a function of the word combination and a portion of one or more user interaction input values included within the user input interaction text data.

Figure 6:
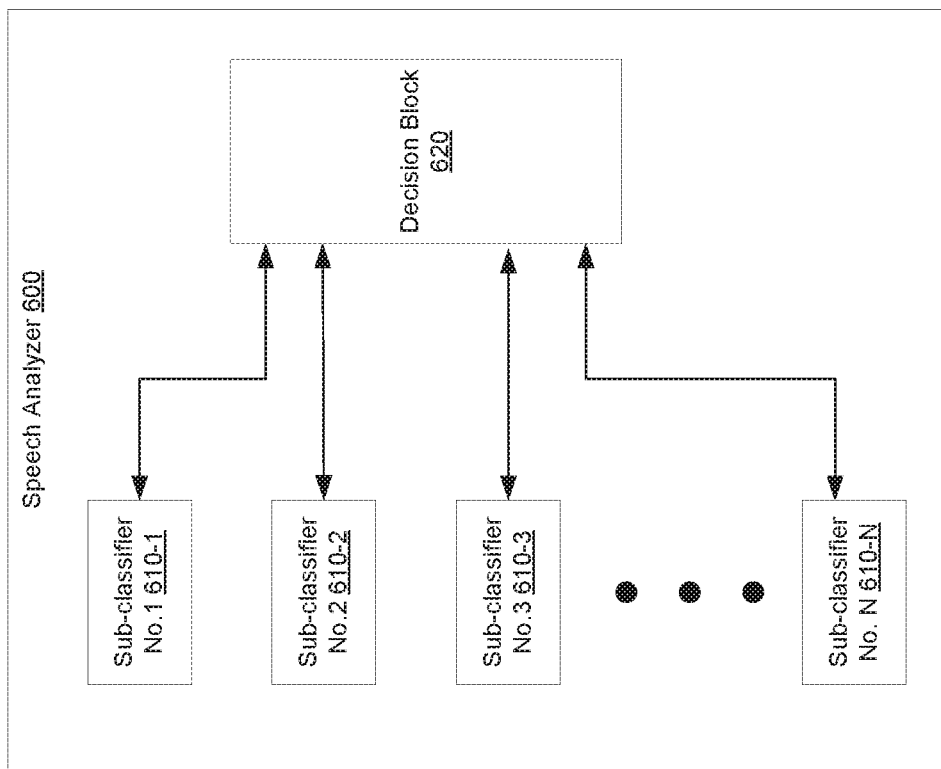
FIG. 6 is a block diagram of an example of a speech analyzer according to some implementations.

FIG. 6 is a block diagram of an example of a speech analyzer 600 according to some implementations. While pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions and sub-functions implemented by speech analyzer 600 can be combined into one or more systems and/or further sub-divided into additional subsystems; and, that the functionality described below is provided as merely one example configuration of the various aspects and functions described herein. In some implementations, the speech analyzer 600 or portions thereof are similar to and adapted from the speech analyzer 510 in FIG. 5. One of ordinary skill in the art will appreciate that some or all of the analyzers 510-520 in FIG. 5 may include some or all of the components of the speech analyzer 600.

The speech analyzer 600 includes sub-classifiers 610-1-610-N and a decision block 620. According to various implementations, the sub-classifiers 610-1-610-N and the decision block 620 cooperate in order to classify speech data. According to various implementations, one or more of the sub-classifiers 610-1-610-N and the decision block 620 include one or more of: a linear regression subsystem, a logistic regression subsystem, a naïve Bayes subsystem, a small neural network subsystem, a deep learning neural network subsystem, an SVM subsystem, an SVM RBF subsystem, an SVM linear subsystem, an SVM polynomial subsystem, an SVM sigmoid subsystem, a random forest (Gini) subsystem, a random forest (entropy) subsystem, etc. For example, in some implementations, one or more of the sub-classifiers 610-1-610-N and the decision block 620 include a sub-classifier neural network, similar to and adapted from a sub-classifier neural network 700, as illustrated in FIG. 7.

Figure 7:
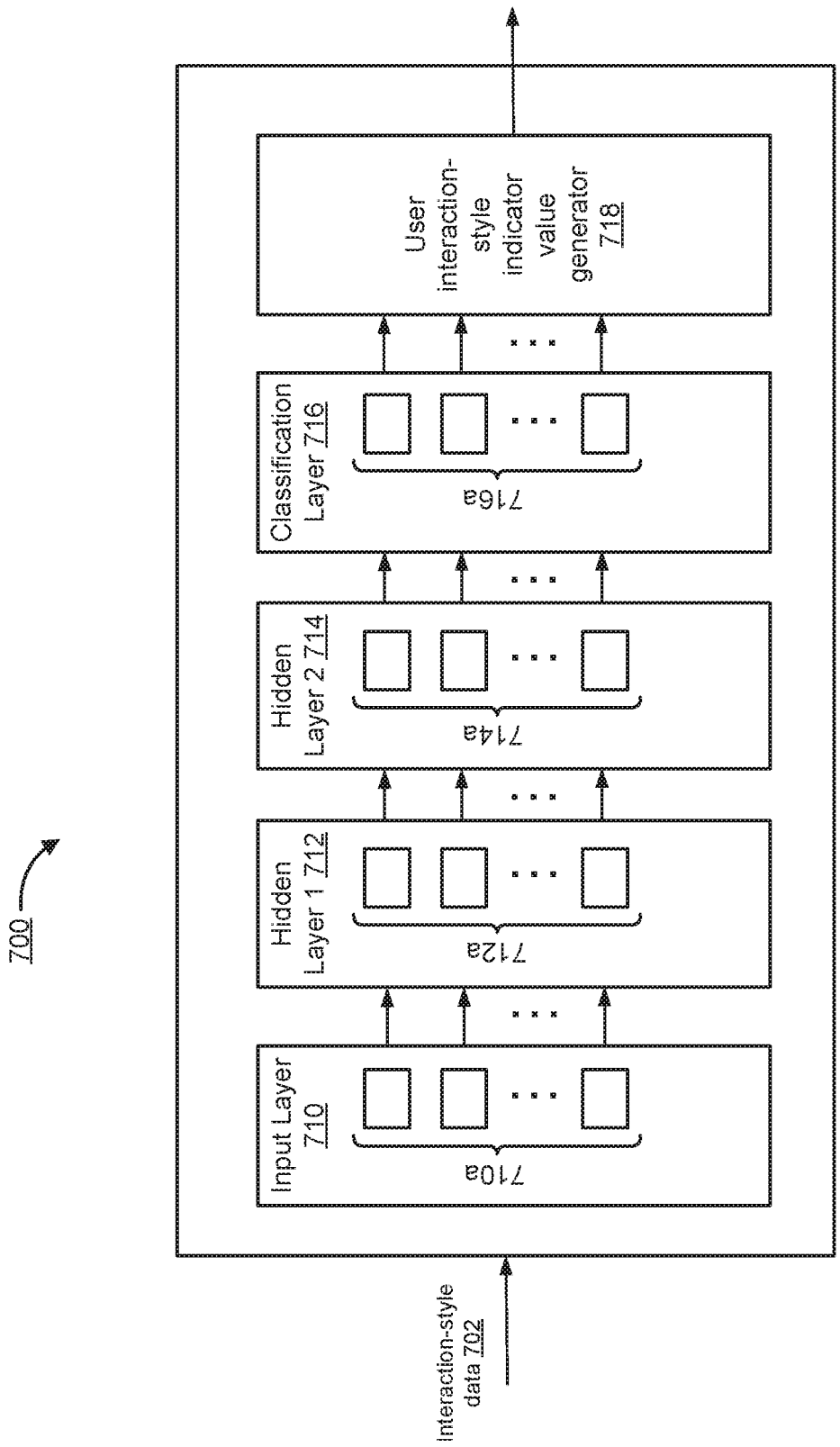
FIG. 7 is a block diagram of an example of a sub-classifier neural network according to some implementations.

FIG. 7 is a block diagram of an example of a sub-classifier neural network 700 according to some implementations. In the example of FIG. 7, the sub-classifier neural network 700 includes an input layer 710, a first hidden layer 712, a second hidden layer 714, a classification layer 716, and a user interaction-style indicator value generator 718. While the sub-classifier neural network 700 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 710 is coupled (e.g., configured) to receive various inputs. For example, in some implementations, the input layer 710 receives interaction-style data 702, such as the interaction-style data 502 in FIG. 5. In various implementations, the input layer 710 includes a number of LSTM logic units 710a, which are also referred to as model(s) of neurons by those of ordinary skill in the art. In some such implementations, an input matrix from the features to the LSTM logic units 710a include rectangular matrices. The size of this matrix is a function of the number of types of input data (e.g., speech data, video data, body language data, gaze data, text data, etc.) included in the interaction-style data 702.

In some implementations, the first hidden layer 712 includes a number of LSTM logic units 712a. In some implementations, the number of LSTM logic units 712a ranges between approximately 10-500. As illustrated in the example of FIG. 7, the first hidden layer 712 receives its inputs from the input layer 710.

In some implementations, the second hidden layer 714 includes a number of LSTM logic units 714a. In some implementations, the number of LSTM logic units 714a is the same as or similar to the number of LSTM logic units 710a in the input layer 710 or the number of LSTM logic units 712a in the first hidden layer 712. As illustrated in the example of FIG. 7, the second hidden layer 714 receives its inputs from the first hidden layer 712. Additionally or alternatively, in some implementations, the second hidden layer 714 receives some or all of its inputs from the input layer 710.

In some implementations, the classification layer 716 includes a number of LSTM logic units 716a. In some implementations, the number of LSTM logic units 716a is the same as or similar to the number of LSTM logic units 710a in the input layer 710, the number of LSTM logic units 712a in the first hidden layer 712, or the number of LSTM logic units 714a in the second hidden layer 714. In some implementations, the classification layer 716 performs a multinomial logistic function (e.g., a softmax function) that produces a number of outputs.

In some implementations, the user interaction-style indicator value generator 718 generates various values by selecting the top N action candidates provided by the classification layer 716. In some implementations, the top N action candidates are most likely to accurately characterize corresponding a word combination. In some implementations, the user interaction-style indicator value generator 718 generates a set of probability or confidence values for characterizations of corresponding word combinations.

In training mode, in some implementations, the user interaction-style indicator value generator 718 generates a plurality of candidate interaction-style indicator values corresponding to a portion of a plurality of word combinations in a training data corpus. Each of the plurality of candidate interaction-style indicator values is based on corresponding one or more words and a corresponding input modality characterization vector. Moreover, each of the plurality of candidate interaction-style indicator values is a function of at least a portion of the corresponding input modality characterization vector and a corresponding semantic assessment of the one or more words.

In run-time (e.g., detection) mode, in some implementations, the user interaction-style indicator value generator 718 generates a user interaction-style indicator value corresponding to a word combination in user input interaction data. The user interaction-style indicator value is a function of the word combination and a portion of a respective one or more user interaction input values associated with the user input interaction data.

Figure 8:
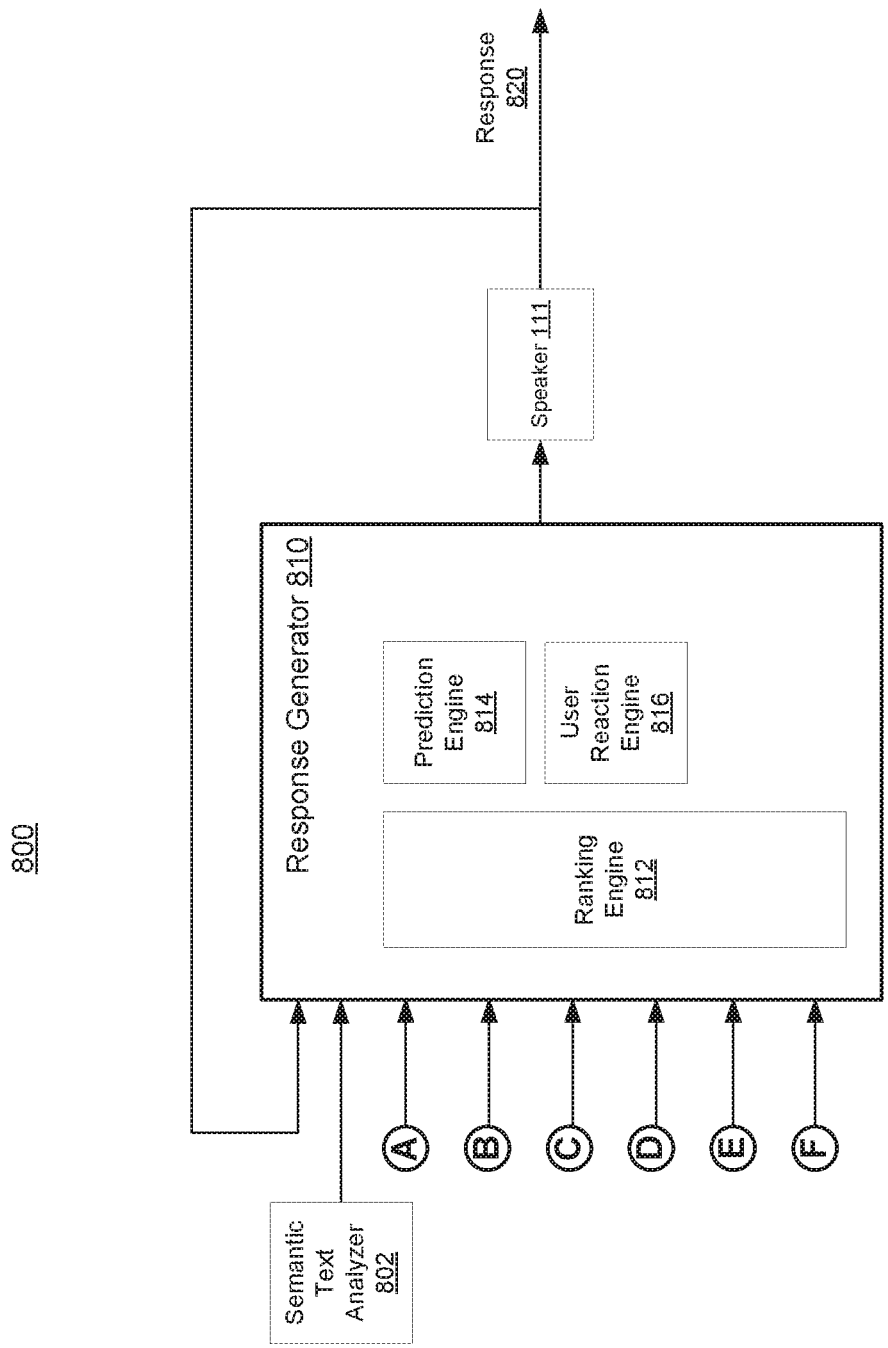
FIG. 8 is a block diagram of an example of a response generation process flow including a response generator according to some implementations.

FIG. 8 is a block diagram of an example of a response generation process flow 800 including a response generator 810 according to some implementations. While pertinent features are illustrated, those of ordinary skill in the art will appreciate from the present disclosure that various other features have not been illustrated for the sake of brevity and so as not to obscure more pertinent aspects of the implementations disclosed herein. In some implementations, the response generator 810 or portions thereof are similar to and adapted from the response generator 230 in FIG. 2.

The response generator 810 obtains one or more user interaction-style indicator values from a user interaction-style classifier. In some implementations, as illustrated in FIG. 8, the response generator 810 obtains the user interaction-style indicator values via inputs A-F, wherein each of the inputs A-F is generated by a corresponding analyzer of the interaction-style classifier 500 illustrated in FIG. 5.

The response generator 810 obtains a semantic assessment of the word combination from a semantic text analyzer 802 (e.g., the semantic text analyzer 228 in FIG. 2 and/or the semantic analyzer 320 in FIG. 3). The semantic text analyzer 802 determines the semantic assessment of the word combination in user input interaction data based on the user interaction-style indicator value and a natural language assessment (e.g., natural language processing (NLP)) of the word combination. As described above, the semantic assessment corresponds to an understanding or meaning of a corresponding word combination. For example, as illustrated in FIG. 8, the semantic assessment input to the response generator 810 provides a meaning of the phrase "Hey, give me directions to the nearest train station" whereas input C (from the body language analyzer 514 in FIG. 5) to the response generator 810 includes body language characterization information that indicates an anxious facial expression and/or hand movements of the user.

The response generator 810 generates (and optionally directs the speaker 111 to play) a response 820 to the user input interaction data according to the user interaction-style indicator value corresponding to the word combination and the semantic assessment of the word combination. Generating the response 820 to the user input interaction data based on the user interaction-style indicator value and based on the semantic assessment improves the accuracy and therefore usefulness of the response 820 to the user input interaction data. Consequently, the machine assistant avoids obtaining validation inputs, thereby reducing resource utilization of the machine assistant.

As one example, in some implementations, when the user interaction-style indicator value indicates sarcasm, then the semantic assessment may be modified (e.g., reversed) in value. For example, the machine assistant obtains first user input interaction data corresponding to a query "what should I do today?" and provides a response suggesting to go to the beach. Subsequently, in response to obtaining a user interaction-style indicator value indicative of sarcasm, the response generator 810 reverses the semantic assessment corresponding to second user input interaction data "Yes, please give me directions to the beach. I love to burn in the sun with complete strangers everywhere!" Accordingly, rather than providing, for example, directions to the beach, the response generator 810 provides a different (than visiting the beach) response 820 for how to spend the day. On the other hand, in response to obtaining a user interaction-style indicator value indicative of a serious tone of voice, the response generator 810 does not modify the semantic assessment and provides a response 820 corresponding to the unmodified semantic assessment.

In some implementations, the response generator 810 includes a ranking engine 812 and generates the response to the user input interaction data based at least in part on a plurality of rankings. In some implementations, the ranking engine 812 ranks inputs A-F, each of which is provided by a respective analyzer, as illustrated in FIG. 5. In some implementations, the ranking engine 812 ranks each input A-F based on corresponding user input interaction data received. For example, if the user input interaction data includes 90% speech data and 10% text data, the ranking engine 812 gives input A (output of speech analyzer 510 in FIG. 5) far more weight than input E (output of text analyzer 518 in FIG. 5). In some implementations, the ranking engine 812 ranks each input A-F based on a corresponding confidence level associated with a corresponding component of the user interaction-style indicator value. For example, the ranking engine 812 highly ranks input B (word choice analyzer component of the user interaction-style indicator value) based on a correspondingly high confidence level in the accuracy of input B. Accordingly, in this example, the response to the user input interaction data is strongly based on word choice characteristics of the user input interaction data.

In some implementations, the response generator 810 includes a prediction engine 814 and generates the response 820 to the user input interaction data based at least in part on a predicted user interaction-style indicator value. In some implementations, the prediction engine 814 generates predicted user interaction-style indicator value based on historical information about previously generated user interaction-style indicator values. For example, previously generated user interaction-style indicator values indicate user input interaction data characterized by a user who is chatty and upbeat. Accordingly, in this example, the prediction engine 814 generates a predicted user interaction-style indicator value that is biased towards a chatty and upbeat response 820 to user input interaction data.

In some implementations, the response generator 810 includes a user reaction engine 816 and generates subsequent responses 820 to the user input interaction data based at least in part on user reaction to current and/or previous responses 820, as is indicated by the feedback loop illustrated in FIG. 8. In some implementations, the user reaction is determined based on body language (e.g., detected by an image sensor) of a user following a response 820 played the speaker 111. For example, facial expression characteristics generated by a body language analyzer (e.g., the body language analyzer 514 in FIG. 5) and inputted as input C to the response generator 810 indicate a facial expression of disapproval following a played response 820. Consequently, the response generator 810 may interpret the response 820 to have been inaccurate and may attempt to play a rectified response 820. In some implementations, user reaction is determined based on speech following a response 820 played the speaker 111. For example, speech characteristics generated by a speech analyzer (e.g., the speech analyzer 510 in FIG. 5) and inputted as input A to the response generator 810 indicate a perplexed or confused reaction (e.g., "Huh?" or "What?") to a played response 820.

Figure 9:
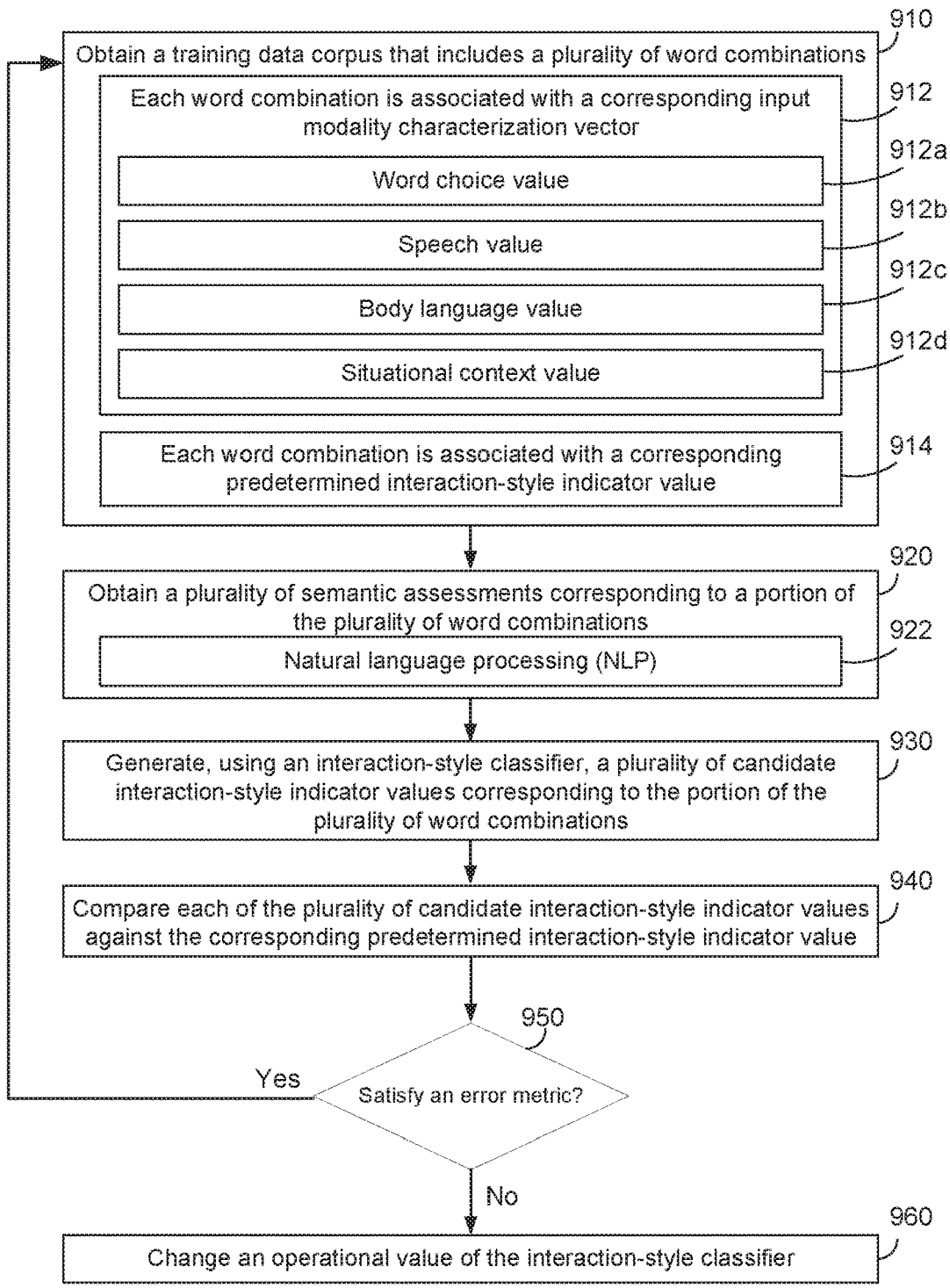
FIG. 9 is a flow diagram of a method of training an interaction-style classifier according to some implementations.

FIG. 9 is a flow diagram of a method 900 of training an interaction-style classifier according to some implementations. In various implementations, the method 900 or portions thereof are performed by a training subsystem (e.g., the training subsystem 224 in FIG. 2 and/or the training subsystem 310 in FIG. 3). Briefly, the method 900 includes training an interaction-style classifier by comparing predetermined interaction-style indicators against corresponding generated candidate user interaction-style indicator values for various word combinations.

As represented by block 910, the method 900 includes obtaining a training data corpus that includes a plurality of word combinations, wherein each of the plurality of word combinations includes one or more words. According to various implementations, the plurality of word combinations corresponds to one or more of: one-word, multiple words, or a portion of one word (e.g., syllable, phoneme, etc.).

As represented by block 912, each of the plurality of word combinations is associated with a corresponding input modality characterization vector, such as the input modality characterization vectors 410-1-410-M as illustrated in FIG. 4. Each of the input modality characterization vectors provides one or more quantitative measurements, such as 50 words typed per minute, a 10 kHz speech tone, 1.6 typing mistakes per minute, etc.

In some implementations, a particular input modality characterization vector includes a number of elements. For example, in some implementations, as represented by block 912a, a particular input modality characterization vector includes a word choice value. In some implementations, the word choice value corresponding to typed words (e.g., chat bot implementation) and/or spoken words. As one example, the word choice value corresponds to typing speed, how hard typing keys are pressed, number of erroneous words (e.g., misspelled), ratio of erroneous words to correct words, number of unnecessary words, verbosity level, and/or the like.

As another example, as represented by block 912b, a particular input modality characterization vector includes a speech value. In some implementations, the speech value corresponds to one or more of: pitch, cadence, amplitude, tone, inflection, intonation (e.g., variations in intonation, decaying intonation), decaying intonation, accent, dialect, and/or the like. As one example, lower decay values in speech correspond to a lower verbosity level. As one example, variations in intonation corresponds to a higher verbosity level.

As another example, as represented by block 912c, a particular input modality characterization vector includes a body language value. In some implementations, the body language value corresponds to one or more of: body language indicators (e.g., hand gestures, swinging arms, thumbs-up, gait, posture, etc.); facial features, such as facial attributes (e.g., facial temperature) and facial expressions (e.g., facial movements such as eyebrow movements, happy versus sad expressions); and/or the like. As one example, more head nodding in facial behavior aspect of body language data indicates a higher level of verbosity. As one example, more exaggerated hand gestures in the body language data indicates a higher level of verbosity.

As another example, as represented by block 912d, a particular input modality characterization vector includes a situational context value, such as whether or not a user is by himself or with others (and with whom), location (e.g., at loud nightclub versus quiet library, GPS location, address), user is performing a task (e.g., user has been exercising for 12 minutes), and/or the like.

As represented by block 914, each of the plurality of word combinations is associated with a corresponding predetermined interaction-style indicator value. The corresponding predetermined interaction-style indicator value is a function of one or more elements of the corresponding input modality characterization vector and a predetermined semantic characterization of the one or more words. The predetermined interaction-style indicator value is a qualitative measurement, such as curt, rude, chatty, neutral, excited, quiet, and/or the like. The predetermined interaction-style indicator value is the ground truth about a particular word combination and the corresponding input modality characterization vector. In some implementations, the predetermined interaction-style indicator value is based on answers to a questionnaire provided to the user.

As represented by block 920, the method 900 includes obtaining (e.g., generating, determining, synthesizing, etc.) a plurality of semantic assessments corresponding to a portion of the plurality of word combinations in the training data corpus. A semantic assessment corresponds to an understanding or meaning of the corresponding word combination. In some implementations, each semantic assessment includes one or more candidate interpretations of the corresponding word combination. As represented by block 922, in some implementations, the plurality of semantic assessments is generated via natural language processing (NLP), such as generated by the natural language processor 228a in FIG. 2.

As represented by block 930, the method 900 includes generating, using an interaction-style classifier, a plurality of candidate interaction-style indicator values corresponding to the portion of the plurality of word combinations in the training data corpus. Each of the plurality of candidate interaction-style indicator values is based on the corresponding one or more words and the corresponding input modality characterization vector. Each of the plurality of candidate interaction-style indicator values is a function of at least a portion of the corresponding input modality characterization vector and the corresponding semantic assessment of the one or more words. In some implementations, the interaction-style classifier or portions thereof correspond to the interaction-style classifier 222 in FIG. 2, the interaction-style classifier 330 in FIG. 3, and/or the interaction-style classifier 500 in FIG. 5.

In some implementations, the interaction-style classifier includes a number of analyzers for analyzing the corresponding one or more words and the corresponding input modality characterization vector. For example, in some implementations, the interaction-style classifier includes one or more of: a speech analyzer (e.g., the speech analyzer 510 in FIG. 5), a word choice analyzer (e.g., the word choice analyzer 512 in FIG. 5), a body language analyzer (e.g., the body language analyzer 514 in FIG. 5), a situational context analyzer (e.g., the situational context analyzer 516 in FIG. 5), and/or a text analyzer (e.g., the text analyzer 518 in FIG. 5). As another example, in some implementations, the interaction-style classifier synthesizes respective outputs of two or more analyzers, such as via utilizing the ensemble interaction-style analyzer 520 in FIG. 5. In some implementations, the interaction-style classifier utilizes one or more of: linear regression subsystem, logistic regression subsystem, naïve Bayes subsystem, small neural network subsystem, deep learning neural network subsystem, SVM subsystem, SVM RBF subsystem, SVM linear subsystem, SVM polynomial subsystem, SVM sigmoid subsystem, random forest (Gini) subsystem, random forest (entropy) subsystem, and/or the like.

As represented by block 940, the method 900 includes comparing each of the plurality of candidate interaction-style indicator values against the corresponding predetermined interaction-style indicator value.

As represented by block 950, in some implementations, the method 900 includes determining whether or not an aggregated result of the comparison between each of the plurality of candidate interaction-style indicator values against the corresponding predetermined interaction-style indicator value does not satisfy an error metric. In response to determining the error metric is satisfied ("Yes" path), the method 900 reverts back to a portion of the method 900 represented by block 910. On the other hand, in response to determining the error metric is not satisfied ("No" path), the method 900 continues to a portion of the method 900 represented by block 960.

As represented by block 960, the method 900 includes in response to determining that an aggregated result of the comparison between each of the plurality of candidate interaction-style indicator values against the corresponding predetermined interaction-style indicator value does not satisfy the error metric, changing an operational value of the interaction-style classifier. In some implementations, the method 900 includes aggregating some or all of the comparison results. In some implementations, the error metric is satisfied when a sufficient number of the plurality of candidate interaction-style indicator values match the predetermined interaction-style indicator value within a threshold percentage.

Figure 10:
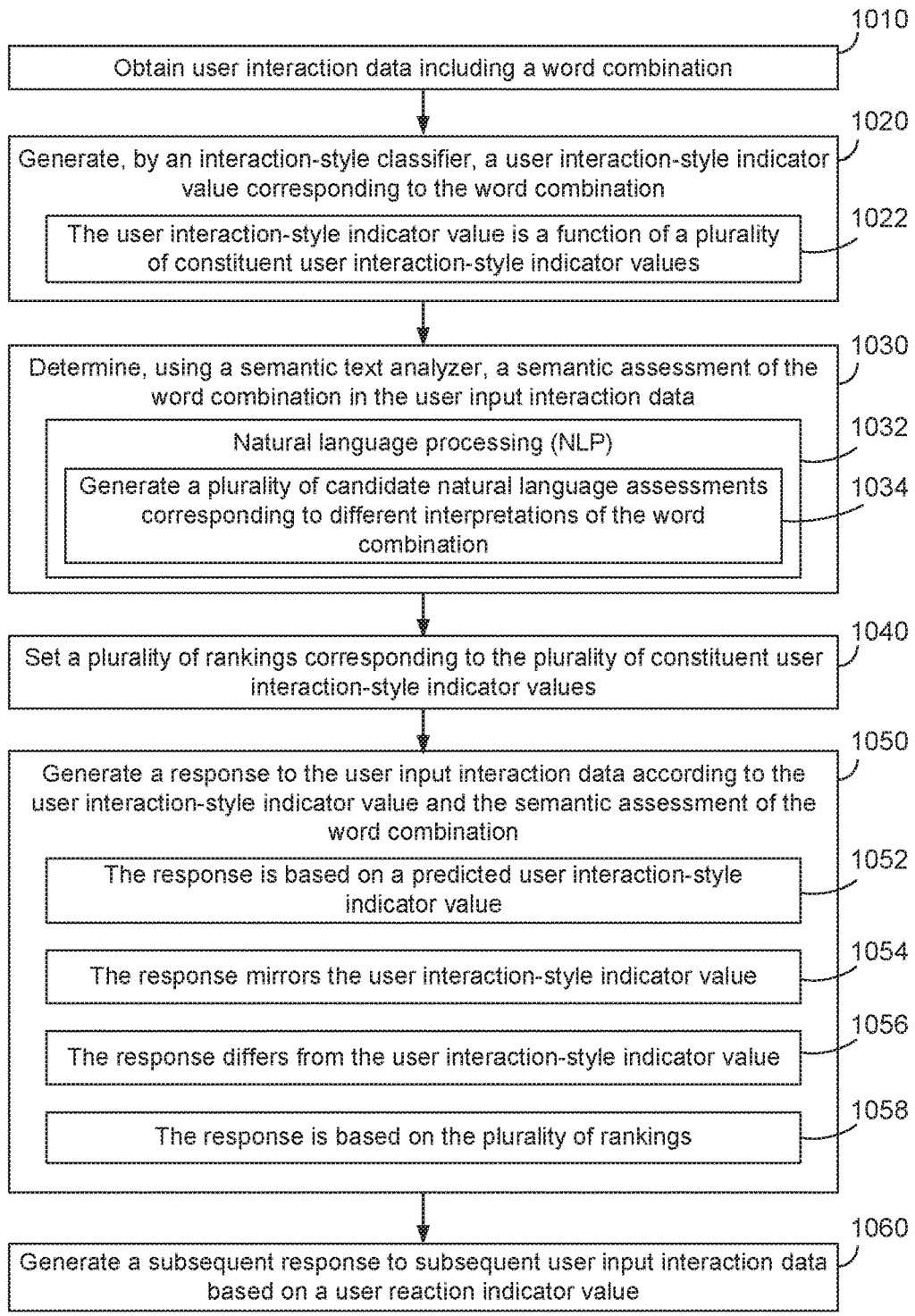
FIG. 10 is a flow diagram of a method of generating a response to user input interaction data according to some implementations.

FIG. 10 is a flow diagram of a method 1000 of generating a response to user input interaction data according to some implementations. In various implementations, the method 1000 or portions thereof are performed by a response generator (e.g., the response generator 230 in FIG. 2 and/or the response generator 810 in FIG. 8). Briefly, the method 1000 includes generating a response to user interaction input data including a word combination, wherein the response is based on an interaction-style indicator value corresponding to the word combination and a semantic assessment of the word combination.

As represented by block 1010, the method 1000 includes obtaining user input interaction data, via one or more input devices. The user input interaction data includes one or more user interaction input values respectively obtained from the corresponding one or more input devices. The user input interaction data includes a word combination. According to various implementations, the user input interaction data corresponds to one or more of: speech data (e.g., a command, a query); text data (e.g., typed into a keyboard, touch input to touch-sensitive surface, in connection with a chatbot implementation); word choice data (e.g., number of errors, superfluous or extraneous words, etc.); body language data captured by, for example, an image sensor; situational context data (e.g., user's location, bystanders of the user, etc.); and/or the like.

As represented by block 1020, the method 1000 includes generating, by an interaction-style classifier, a user interaction-style indicator value corresponding to the word combination in the user input interaction data. The user interaction-style indicator value is a function of the word combination and a portion of the one or more user interaction input values. In some implementations, the interaction-style classifier or portions thereof correspond to the interaction-style classifier 222 in FIG. 2, the interaction-style classifier 330 in FIG. 3, and/or the interaction-style classifier 500 in FIG. 5.

In some implementations, the interaction-style classifier includes a number of analyzers for analyzing corresponding types of user input interaction data. For example, in some implementations, the interaction-style classifier includes one or more of: a speech analyzer (e.g., the speech analyzer 510 in FIG. 5), a word choice analyzer (e.g., the word choice analyzer 512 in FIG. 5), a body language analyzer (e.g., the body language analyzer 514 in FIG. 5), a situational context analyzer (e.g., the situational context analyzer 516 in FIG. 5), and/or a text analyzer (e.g., the text analyzer 518 in FIG. 5). As another example, in some implementations, the interaction-style classifier includes a combination or two or more analyzers, such as via utilizing the ensemble interaction-style analyzer 520 in FIG. 5. In some implementations, the interaction-style classifier utilizes one or more of: linear regression subsystem, logistic regression subsystem, naïve Bayes subsystem, small neural network subsystem, deep learning neural network subsystem, SVM subsystem, SVM RBF subsystem, SVM linear subsystem, SVM polynomial subsystem, SVM sigmoid subsystem, random forest (Gini) subsystem, random forest (entropy) subsystem, and/or the like.

As represented by block 1022, in some implementations, the user interaction-style indicator value is a function of a plurality of constituent user interaction-style indicator values. For example, in some implementations, the user interaction-style indicator value is a function of two or more of: a speech interaction-style indicator value, a body language interaction-style indicator value, a word choice interaction-style indicator value, a text interaction-style indicator value, and a situational context interaction-style indicator value. As one example, with reference to FIG. 5, the user interaction-style indicator value corresponds to output "F" of the ensemble interaction-style analyzer 520, which utilizes two or more of inputs "A," "B," "C," "D," and "E" generated by analyzers 510, 512, 514, 516, and 518, respectively.

As represented by block 1030, the method 1000 includes determining, using a semantic text analyzer, a semantic assessment of the word combination in the user input interaction data based on the user interaction-style indicator value and a natural language assessment of the word combination. The semantic assessment corresponds to an understanding or meaning of the word combination. In some implementations, the semantic text analyzer corresponds to the semantic text analyzer 228 in FIG. 2. In some implementations, the semantic text analyzer corresponds to the semantic text analyzer 802 in FIG. 8.

As represented by block 1032, in some implementations, a natural language processor (NLP) generates the natural language assessment of the word combination. For example, with reference to FIG. 2, the natural language assessment is generated by the natural language processor 228a. As represented by block 1034, in some implementations, the NLP generates a plurality of candidate natural language assessments included in the natural language assessment of the word combination. Each of the plurality of candidate natural language assessments corresponds to a respective interpretation of the word combination. The respective interpretations of the word combination are different from each other.

As represented by block 1040, in some implementations, the method 1000 includes setting a plurality of rankings corresponding to the plurality of constituent user interaction-style indicator values. For example, a speech interaction-style indicator value is ranked higher than a body language interaction-style indicator value because, under current circumstances, speech user input interaction data is more reliable than body language user input interaction data. In some implementations, a ranking engine (e.g., the ranking engine 812 in FIG. 8) sets the plurality of rankings.

As represented by block 1050, the method 1000 includes generating a response to the user input interaction data according to the user interaction-style indicator value and the semantic assessment of the word combination. In some implementations, if the user interaction-style indicator value indicates sarcasm, then the semantic assessment is modified. For example, a semantic assessment corresponding to "Thanks for the great directions—I was only an hour late" coupled with a user interaction-style indicator value indicating sarcasm results in an apologetic response ("sorry—my mistake") rather than "you are welcome."

As represented by block 1052, in some implementations, generating the response to the user input interaction data is based at least in part on a predicted user interaction-style indicator value. For example, in some implementations, the predicted user interaction-style indicator value is based on historical information about previously generated user interaction-style indicator values. In some implementations, the method 1000 includes obtaining, from a prediction engine (e.g., the prediction engine 814 in FIG. 8), the predicted user interaction-style indicator value.

As represented by block 1054, in some implementations, the response to the user input interaction data is characterized by a response interaction-style indicator value, wherein a difference between the response interaction-style indicator value and the user interaction-style indicator value satisfies a mirroring threshold. There is evidence suggesting that, for some users, a response having an interaction style similar to (e.g., mirroring) the user input interaction data engenders user confidence in the machine assistant.

As represented by block 1056, in some implementations, the response to user input interaction data is characterized by a response interaction-style indicator value, wherein a difference between the response interaction-style indicator value and the user interaction-style indicator value satisfies a difference threshold. There is evidence suggesting that, for some users, a response having an interaction style that is too similar to the user input interaction data results in a negative user reaction and therefore reduces user confidence in the machine assistant.

As represented by block 1058, in some implementations, the response to the user input interaction data is based at least in part on the plurality of rankings set by a portion of the method 1000 represented by block 1040, as discussed above.

As represented by block 1060, in some implementations, the method 1000 includes generating a subsequent response to subsequent user input interaction data based at least in part on a user reaction indicator value. For example, the user reaction indicator value is determined based on facial expressions and/or body language of a user following the response being played back to the user. As another example, the user reaction indicator value is determined based on speech user input interaction data provided by the user following the response being played back to the user. In some implementations, the method 1000 includes obtaining, from a user reaction engine (e.g., the user reaction engine 816 in FIG. 8), the user reaction indicator value indicative of a reaction to the response.

Figure 11:
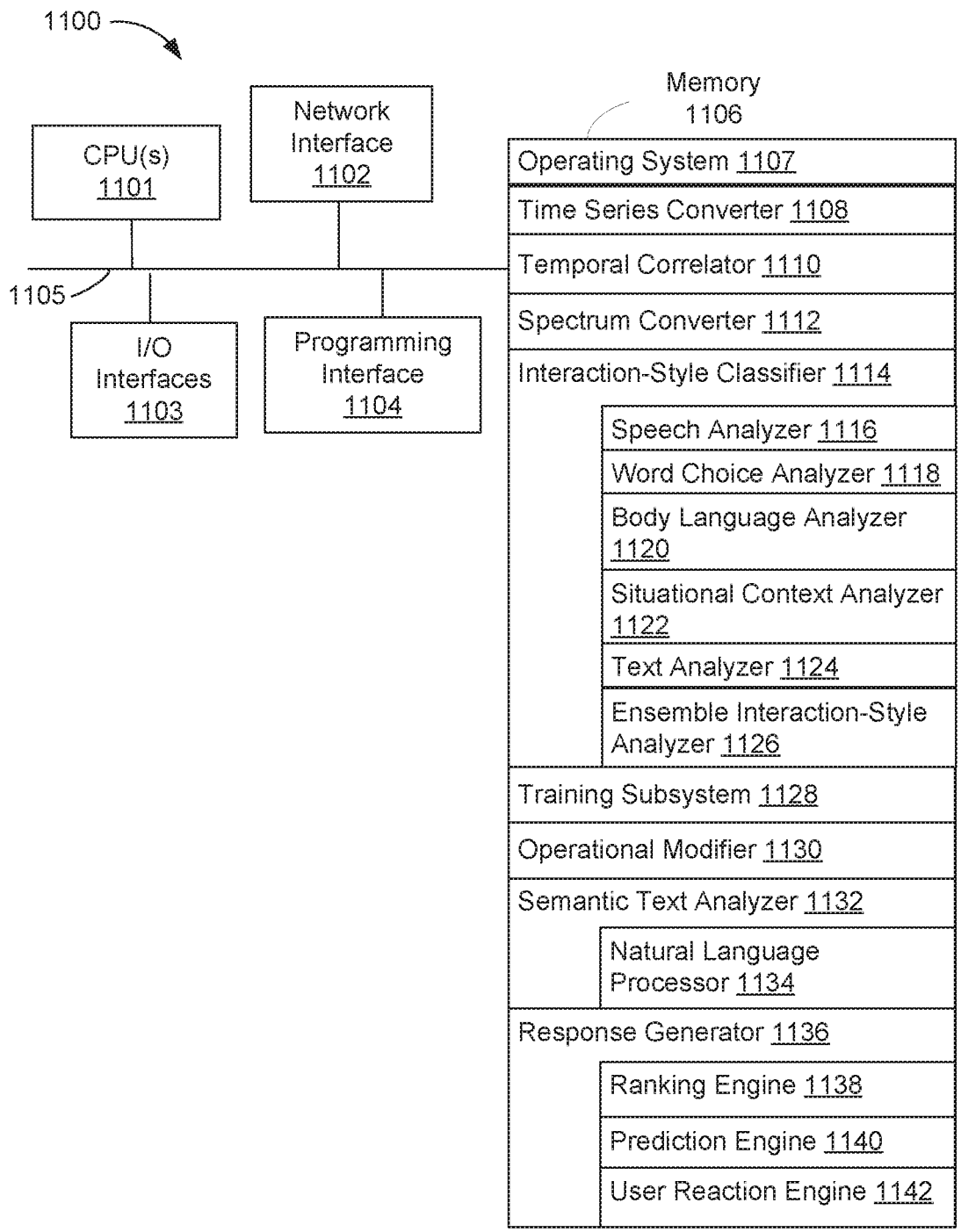
FIG. 11 is a block diagram of an example of an electronic device according to some implementations.

FIG. 11 is a block diagram of an example of an electronic device 1100 according to some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, the electronic device 1100 includes one or more processing units (CPUs) 1101, a network interface 1102, one or more input/output (I/O) devices 1103, a programming interface 1104, a memory 1106, and one or more communication buses 1105 for interconnecting these and various other components. In some implementations, the communication buses 1105 include circuitry that interconnects and controls communications between system components.

The memory 1106 includes high-speed random-access memory, such as DRAM, SRAM, DDR RAM or other random-access solid-state memory devices, and may include non-volatile memory, such as one or more magnetic disk storage devices, optical disk storage devices, flash memory devices, or other non-volatile solid-state storage devices. The memory 1106 optionally includes one or more storage devices remotely located from the one or more CPUs 1101. The memory 1106 comprises a non-transitory computer readable storage medium.

In some implementations, the memory 1106 or the non-transitory computer readable storage medium of the memory 1106 stores the following programs, modules and data structures, or a subset thereof including an optional operating system 1107, a times series converter 1108 (e.g., the times series converter 214 in FIG. 2), a temporal correlator 1110 (e.g., temporal correlator 216 in FIG. 2), a spectrum converter 1112 (e.g., the spectrum converter 218 in FIG. 2), an interaction-style classifier 1114, a training subsystem 1128, an operational modifier 1130 (e.g., the operational modifier 226 in FIG. 2 and/or the operational modifier 340 in FIG. 3), a semantic text analyzer 1132, and a response generator 1136.

In some implementations, the interaction-style classifier 1114 is configured to generate a plurality of candidate interaction-style indicator values. In some implementations, the interaction-style classifier 1114 is configured to generate a user interaction-style indicator value. To those ends, in some implementations, the interaction-style classifier 1114 or portions thereof are included in the interaction-style classifier 222 in FIG. 2, the interaction-style classifier 330 in FIG. 3, and/or the interaction-style classifier 500 in FIG. 5. In some implementations, the interaction-style classifier 1114 includes one or more analyzers: a speech analyzer 1116, a word choice analyzer 1118, a body language analyzer 1120, a situational context analyzer 1122, a text analyzer 1124, and/or an ensemble interaction-style analyzer 1126, as illustrated in FIG. 11.

In some implementations, the training subsystem 1128 is configured to train the interaction-style classifier 1114 by comparing predetermined interaction-style indicators against corresponding generated candidate user interaction-style indicator values for various word combinations. To that end, in some implementations, the training subsystem 1128 or potions thereof are included in the training subsystem 224 in FIG. 2 and/or the training subsystem 310 in FIG. 3.

In some implementations, the semantic text analyzer 1132 is configured to determine a semantic assessment of the word combination. To that end, in some implementations, the semantic text analyzer 1132 or portions thereof are included in the semantic text analyzer 228 in FIG. 2, the semantic text analyzer 320 in FIG. 3, and/or the semantic text analyzer 802 in FIG. 8. In some implementations, the semantic text analyzer 1132 includes a natural language processor (NLP) 1134, as illustrated in FIG. 11, such as the natural language processor 228a in FIG. 2.

In some implementations, the response generator 1136 is configured to generate a response to user interaction input data including a word combination, wherein the response is based on an interaction-style indicator value corresponding to the word combination and a semantic assessment of the word combination. To that end, in some implementations, the response generator 1136 or portions thereof are included in the response generator 230 in FIG. 2 and/or the response generator 810 in FIG. 8. In some implementations, the response generator 1136 includes one or more of a ranking engine 1138 (e.g., the ranking engine 812 in FIG. 8), a prediction engine 1140 (e.g., the prediction engine 814 in FIG. 8), and/or a user reaction engine 1142 (e.g., the user reaction engine 816 in FIG. 8).

Moreover, FIG. 11 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at an electronic device including one or more processors, a non-transitory memory, and one or more input devices:
   obtaining user input interaction data, via the one or more input devices, wherein the user input interaction data includes one or more user interaction input values respectively obtained from the one or more input devices, wherein the user input interaction data includes a word combination, and wherein the user input interaction data represents user speech;
   obtaining situational context information that indicates a situational context of the electronic device;
   generating, by an interaction-style classifier, a user interaction-style indicator value corresponding to the word combination in the user input interaction data, wherein the user interaction-style indicator value is a function of the word combination a portion of the one or more user interaction input values and the situational context of the electronic device, and wherein the user interaction-style indicator value includes a speech characteristic characterizing the user speech;
   determining, using a semantic text analyzer, a semantic assessment of the word combination in the user input interaction data based on the user interaction-style indicator value and a natural language assessment of the word combination; and
   generating a response to the user input interaction data according to the user interaction-style indicator value and the semantic assessment of the word combination, wherein the response is associated with a response interaction-style indicator value that matches the user interaction-style value.

2. The method of claim 1, further comprising, obtaining, from a prediction engine, a predicted user interaction-style indicator value;
wherein generating the response to the user input interaction data is based at least in part on the predicted user interaction-style indicator value.

3. The method of claim 1, further comprising:
obtaining, from a user reaction engine, a user reaction indicator value indicative of a reaction to the response; and
generating a subsequent response to subsequent user input interaction data based at least in part on the user reaction indicator value.

4. The method of claim 1, wherein the semantic text analyzer includes a natural language processor (NLP) that generates the natural language assessment of the word combination.

5. The method of claim 4, wherein the NLP generates a plurality of candidate natural language assessments included in the natural language assessment of the word combination, wherein each of the plurality of candidate natural language assessments corresponds to a respective interpretation of the word combination, and wherein the respective interpretations of the word combination are different from each other.

6. The method of claim 1, wherein a difference between the response interaction-style indicator value and the user interaction-style indicator value satisfies a mirroring threshold.

7. The method of claim 1, wherein a difference between the response interaction-style indicator value and the user interaction-style indicator value satisfies a difference threshold.

8. The method of claim 1, wherein the user interaction-style indicator value is a function of a plurality of constituent user interaction-style indicator values, including two or more of: a speech interaction-style indicator value, a body language interaction-style indicator value, a word choice interaction-style indicator value, a text interaction-style indicator value, and a situational context interaction-style indicator value.

9. The method of claim 8, further comprising setting a plurality of rankings corresponding to the plurality of constituent user interaction-style indicator values, wherein the response to the user input interaction data is based at least in part on the plurality of rankings.

10. The method of claim 1, wherein the speech characteristic includes one or more of pitch, frequency, speed, rhythm, cadence, amplitude, tone, inflection, or an intonation pattern.

11. The method of claim 1, wherein the situational context indicates a number of bystanders and respective types of the bystanders, and wherein the user interaction-style indicator value is further a function of the number of the bystanders and the respective types of the bystanders.

12. The method of claim 1, further comprising obtaining, via an image sensor, image data that depicts a user of the electronic device, wherein the user-interaction-style indicator value is further a function of the image data depicting the user of the electronic device.

13. The method of claim 12, wherein the image data indicates a body pose of the user and the user interaction-style indicator value is further a function of the body pose of the user.

14. The method of claim 1, wherein the situational context information indicates an activity that a person proximate to the electronic device is currently performing.

15. The method of claim 1, wherein the situational context information indicates a body language of a person proximate to the electronic device.

16. An electronic device comprising:
one or more processors;
a non-transitory memory;
one or more input devices; and
one or more programs, wherein the one or more programs are stored in the non-transitory memory and configured to be executed by the one or more processors, the one or more programs including instructions for:
obtaining user input interaction data, via the one or more input devices,
wherein the user input interaction data includes one or more user interaction input values respectively obtained from the one or more input devices, wherein the user input interaction data includes a word combination, and wherein the user input interaction data represents user speech;
obtaining situational context information that indicates a situational context of the electronic device;
generating, by an interaction-style classifier, a user interaction-style indicator value corresponding to the word combination in the user input interaction data, wherein the user interaction-style indicator value is a function of the word combination a portion of the one or more user interaction input values and the situational context of the electronic device, and wherein the user interaction-style indicator value includes a speech characteristic characterizing the user speech;
determining, using a semantic text analyzer, a semantic assessment of the word combination in the user input interaction data based on the user interaction-style indicator value and a natural language assessment of the word combination; and
generating a response to the user input interaction data according to the user interaction-style indicator value and the semantic assessment of the word combination,
wherein the response is associated with a response interaction-style indicator value that matches the user interaction-style value.

17. The electronic device of claim 16, wherein the one or more programs include instructions for obtaining, from a prediction engine, a predicted user interaction-style indicator value, wherein generating the response to the user input interaction data is based at least in part on the predicted user interaction-style indicator value.

18. The electronic device of claim 16, wherein the one or more programs include instructions for:
obtaining, from a user reaction engine, a user reaction indicator value indicative of a reaction to the response; and
generating a subsequent response to subsequent user input interaction data based at least in part on the user reaction indicator value.

19. The electronic device of claim 16, wherein the semantic text analyzer includes a natural language processor (NLP) that generates the natural language assessment of the word combination.

20. The electronic device of claim 19, wherein the NLP generates a plurality of candidate natural language assessments included in the natural language assessment of the word combination, wherein each of the plurality of candidate natural language assessments corresponds to a respective interpretation of the word combination, and wherein the respective interpretations of the word combination are different from each other.

21. The electronic device of claim 16, wherein a difference between the response interaction-style indicator value and the user interaction-style indicator value satisfies a mirroring threshold.

22. The electronic device of claim 16, wherein the situational context information indicates a number of people that are proximate to the electronic device and can hear the response generated by the electronic device.

23. The electronic device of claim 16, wherein the situational context information indicates a task that a user of the electronic device is currently performing.

24. A non-transitory computer readable storage medium storing one or more programs, the one or more programs comprising instructions, which, when executed by an electronic device with one or more processors and one or more input devices, cause the electronic device to:

obtain user input interaction data, via the one or more input devices, wherein the user input interaction data includes one or more user interaction input values respectively obtained from the one or more input devices, wherein the user input interaction data includes a word combination, and wherein the user input interaction data represents user speech;

obtain situational context information that indicates a situational context of the electronic device;

generate, by an interaction-style classifier, a user interaction-style indicator value corresponding to the word combination in the user input interaction data, wherein the user interaction-style indicator value is a function of the word combination a portion of the one or more user interaction input values and the situational context of the electronic device, and wherein the user interaction-style indicator value includes a speech characteristic characterizing the user speech;

determine, using a semantic text analyzer, a semantic assessment of the word combination in the user input interaction data based on the user interaction-style indicator value and a natural language assessment of the word combination; and generate a response to the user input interaction data according to the user interaction-style indicator value and the semantic assessment of the word combination, wherein the response is associated with a response interaction-style indicator value that matches the user interaction-style value.

25. The non-transitory computer readable storage medium of claim 24, wherein the one or more programs include instructions that cause the electronic device to:

obtain, from a user reaction engine, a user reaction indicator value indicative of a reaction to the response; and generate a subsequent response to subsequent user input interaction data based at least in part on the user reaction indicator value.

26. The non-transitory computer readable storage medium of claim 24, wherein the semantic text analyzer includes a natural language processor (NLP) that generates the natural language assessment of the word combination.

27. The non-transitory computer readable storage medium of claim 26, wherein the NLP generates a plurality of candidate natural language assessments included in the natural language assessment of the word combination, wherein each of the plurality of candidate natural language assessments corresponds to a respective interpretation of the word combination, and wherein the respective interpretations of the word combination are different from each other.

28. The non-transitory computer readable storage medium of claim 24, wherein a difference between the response interaction-style indicator value and the user interaction-style indicator value satisfies a mirroring threshold.

29. The non-transitory computer readable storage medium of claim 24, wherein the situational context information indicates a body language of a user of the electronic device.

* * * * *